(12) United States Patent
Satoh et al.

(10) Patent No.: US 6,653,017 B2
(45) Date of Patent: Nov. 25, 2003

(54) NONAQUEOUS ELECTROLYTE SECONDARY CELLS

(75) Inventors: Kouichi Satoh, Itami (JP); Naoya Nakanishi, Tondabayashi (JP); Noboru Nakano, Mihara-gun (JP); Toshiyuki Nohma, Hirakata (JP); Ikuo Yonezu, Hirakata (JP)

(73) Assignee: Sanyo Electric Co., Ltd., Osaka (JP)

(*) Notice: Subject to any disclaimer, the term of this patent is extended or adjusted under 35 U.S.C. 154(b) by 243 days.

(21) Appl. No.: 09/804,473

(22) Filed: Mar. 13, 2001

(65) Prior Publication Data
US 2002/0004162 A1 Jan. 10, 2002

(30) Foreign Application Priority Data

Mar. 14, 2000 (JP) ........................................ 2000-070927
Sep. 26, 2000 (JP) ........................................ 2000-292306
Nov. 29, 2000 (JP) ........................................ 2000-362515

(51) Int. Cl.[7] ................................................ H01M 2/06
(52) U.S. Cl. ........................................ 429/178; 429/244
(58) Field of Search ................................ 429/178, 179, 429/122, 233, 244, 99

(56) References Cited

U.S. PATENT DOCUMENTS

| 5,532,081 | A | * | 7/1996 | DePalma et al. | 429/171 |
| 6,235,426 | B1 | * | 5/2001 | Yanai et al. | 429/211 |
| 6,287,719 | B1 | * | 9/2001 | Bailey | 429/94 |
| 2001/0023038 | A1 | * | 9/2001 | Ligeois et al. | 429/161 |

FOREIGN PATENT DOCUMENTS

| DE | 12 33 040 B | 1/1967 |
| GB | 1059004 | 2/1967 |

OTHER PUBLICATIONS

Patent Abstract of Japan, Publication No. 60 065452, Publication Date Apr. 15, 1985.
Patent Abstract of Japan, Publication No. 60 072160, Publication Date Apr. 24, 1985.
Patent Abstract of Japan, Publication No. 10 261399, Publication Date Sep. 29, 1998.
Patent Abstract of Japan, Publication No. 2000 243372, Publication Date Sep. 8, 2000.
Patent Abstract of Japan, Publication No. 2001 256950, Publication Date Sep. 21, 2001.

* cited by examiner

Primary Examiner—Randy Gulakowski
Assistant Examiner—Monique Wills
(74) Attorney, Agent, or Firm—Kubovcik & Kubovcik

(57) ABSTRACT

In a nonaqueous electrolyte secondary cell comprising a rolled-up electrode unit 4 encased in a cell can 1, a striplike current collector forming an electrode has an edge 48 projecting from at least one of opposite ends of the electrode unit. A current collecting plate 5 is joined to the current collector edge 48. A plurality of circular-arc protrusions 52 projecting in a circular-arc cross section and a plurality of slit pieces 53 are formed radially on the current collecting plate 5 and opposed to the current collector edge 48. The collecting plate 5 is welded to the current collector edge 48, with the protrusions 52 and the slit pieces 53 biting into the current collector edge 48, whereby high current collecting performance is available.

15 Claims, 19 Drawing Sheets

A – A SECTION

B – B SECTION

PIROR ART

NONAQUEOUS ELECTROLYTE SECONDARY CELLS

FIELD OF THE INVENTION

The present invention relates to nonaqueous electrolyte secondary cells which comprise a can and a rolled-up electrode unit accommodated in the can and serving as a secondary cell element and which are adapted to deliver electric power generated by the electrode unit from a pair of electrode terminals provided on the can.

BACKGROUND OF THE INVENTION

In recent years, attention has been directed to lithium secondary cells or batteries having a high energy density for use as power sources for portable electronic devices, electric motor vehicles, etc. Cylindrical lithium secondary cells of relatively large capacity, for example, for use in electric motor vehicles comprise, as shown in FIGS. 11 and 12, a cylindrical cell can 1 having a cylinder 11 and lids 12, 12 welded to the respective ends of the cylinder, and a rolled-up electrode unit 4 encased in the can 1. A pair of positive and negative electrode terminal assemblies 9, 9 are attached to the lids 12, 12, respectively. The two electrodes of the rolled-up electrode unit 4 are connected to the terminal assemblies 9, 9, whereby the electric power generated by the electrode unit 4 can be delivered to an external device from the pair of terminal assemblies 9, 9. Each lid 12 is provided with a gas vent valve 13.

As shown in FIG. 13, the rolled-up electrode unit 4 comprises a positive electrode 41 and a negative electrode 43 which are each in the form of a strip and which are rolled up into a spiral form with a striplike separator 42 interposed between the electrodes. The positive electrode 41 comprises a striplike current collector foil 45 in the form of aluminum foil and coated over opposite surfaces thereof with a positive electrode active substance 44 comprising a lithium containing composite oxide. The negative electrode 43 comprises a striplike current collector foil 47 in the form of copper foil and coated over opposite surfaces thereof with a negative electrode active substance 46 containing a carbon material. The separator 42 is impregnated with a nonaqueous electrolyte.

The positive electrode 41 and the negative electrode 43 are each superposed on the respective separators 42, as displaced from the separator widthwise thereof, and the assembly is rolled up into a spiral form, whereby the edge 48 of the current collector foil 45 of the positive electrode 41 is positioned as projected outward beyond the edge of the separator 42 at one of the axially opposite ends of the electrode unit 4, and the edge 48 of the current collector foil 47 of the negative electrode 43 is positioned as projected outward beyond the edge of the separator 42 at the other end of the unit 4. A current collecting plate 32 in the form of a disk is joined to each of the opposite ends of the electrode unit 4 by resistance welding and connected by a lead member 33 to the base end of the electrode terminal assembly 9 shown in FIG. 12.

The electrode terminal assembly 9 comprises an electrode terminal 91 extending through a hole in the lid 12 of the can 1 and mounted on the lid 12. The electrode terminal 91 has a flange 92 at its base end. An insulating packing 93 is fitted in the hole of the lid 12 for electrically insulating the electrode terminal 91 from the lid 12 and providing a seal therebetween. The electrode terminal 91 has a washer 94 fitted therearound from outside the lid 12, and a first nut 95 and a second nut 96 screwed thereon. The first nut 95 is tightened up to clamp the insulating packing 93 between the flange 92 of the terminal 91 and the washer 94 and thereby seal off the hole more effectively. The outer end of the lead member 33 is fixedly joined to the flange 92 of the terminal 91 by spot welding or ultrasonic welding.

The lithium secondary cell having the current collecting structure shown in FIG. 12 nevertheless has the problem that the edges 48, 48 of the current collector foils 45, 47 forming the positive electrode 41 and the negative electrode 43 of the rolled-up electrode unit 4 have a small area, which results in a small area of contact between each edge of the current collector foil and the corresponding current collecting plate 32, consequently increasing the internal resistance of the cell. Further when the outermost peripheral portion of the current collecting plate 32 is joined to the electrode edge positioned radially most outwardly of the electrode unit 4 by laser welding, the laser beam is likely to leak out from the collecting plate 32 to irradiate the electrode or separator, causing damage to the electrode or separator.

A cylindrical secondary cell of improved power characteristics has been proposed which, as seen in FIG. 17, comprises a positive electrode 81 having an uncoated portion which extends upward beyond a portion thereof coated with an active substance 84 and varies in width longitudinally of the electrode, and a negative electrode 82 having an uncoated portion which extends downward beyond a portion thereof coated with an active substance 85 and varies in width longitudinally of the electrode. The positive and negative electrodes 81, 82 are rolled up into a spiral form with a separator 83 interposed between the electrodes to obtain a rolled-up electrode unit 8 having conical projections 86 as seen in FIG. 18. The electrode unit 8 is encased in a cell can 1. Each of the electrode projections 86 is connected to an electrode terminal 90 by a current collecting lead 80 (JP-A No. 329398/1998).

Although improved to some extent in power characteristics, the secondary cell described requires the step of obliquely cutting an edge of each of the positive and negative electrodes 81, 82 as shown in FIG. 17. This not only makes the fabrication process complex but also presents difficulty in giving an accurately finished conical surface to the projection 86 of the rolled-up electrode unit 8 as shown in FIG. 18 by rolling up the assembly of the two electrodes, consequently entailing the problem of an impaired yield and variations in the properties of cells. Especially in the case of lithium secondary cells for use as power sources in electric motor vehicles, there is a need to reduce the internal resistance to the greatest possible extent so as to obtain a high capacity and a high power. Furthermore, a manufacturing cost reduction requires a current collecting structure of high productivity.

Accordingly, a nonaqueous electrolyte secondary cell having low resistance and excellent in productivity is proposed which has a current collecting plate 7 of the shape shown in FIG. 27 (JP-B No. 4102/1990). The collecting plate 7 has a central hole 74 and a lead portion 75 extending from the outer periphery thereof. The collecting plate 7 further has a plurality of ridges 72 V-shaped in cross section and extending radially from its center. As shown in FIG. 28, these ridges 72 are pressed against and weld to edge portions 48 of electrode of a rolled-up electrode unit 4.

With this cell, the ridges 72 of the collecting plate 7 bite in the edge portions 48 of electrode of the electrode unit 4. The collecting plate is therefore in contact with the edge 48 of the electrode over a greater area than the conventional collecting plate which is in the form of a flat plate. This results in an increase in the quantity of current collected to afford an increased cell power.

However, since the ridges of the collecting plate have a V-shaped cross section with an acute angle, the area of contact of the ridges with the edge of the current collector foil is not sufficiently great. Accordingly, the collecting plate not only has great contact resistance at the weld but is also poor in the state of contact at the portions other than the weld. Thus, the structure described has the problem of low current collecting performance. Moreover, the junction between the V-shaped ridge and the edge of the current collector foil to be irradiated with a laser beam makes an acute angle with the direction of projection of the beam, so that the laser beam fails to act effectively on the junction for welding and is likely to produce a faulty weld joint.

Further for the nonaqueous electrolyte secondary cell to give an improved power, it is effective to reduce the electric resistance of the path through which the electric power produced by the rolled-up electrode unit 4 is delivered to the outside, i.e., the internal resistance, whereas the current collecting plate 7 shown in FIG. 27 is greater in the average distance over which the current collected by the plate 7 flows before flowing into the lead portion 75 because the lead portion 75 extends from the outer periphery of the plate 7. For this reason, the secondary cell incorporating the collecting plate 7 still has great internal resistance.

SUMMARY OF THE INVENTION

A first object of the present invention is to provide a nonaqueous electrolyte secondary cell having a current collecting structure wherein even when the current collectors forming the electrode unit are very thin, the current collector edge is held in satisfactory contact with a current collecting plate to ensure high current collecting performance and which is excellent also in productivity.

A second object of the present invention is to provide a cylindrical secondary cell of the tabless type wherein a current collecting plate can be welded to the end of a rolled-up electrode unit without the likelihood of causing damage to the electrode or the separator and which can be fabricated by a simple process, the cell further exhibiting excellent power characteristics.

A third object of the present invention is to provide a nonaqueous electrolyte secondary cell which has a current collecting structure comprising a current collecting plate and which is smaller than conventionally in internal resistance.
Construction for Fulfilling the First Object The present invention provides a nonaqueous electrolyte secondary cell wherein a current collector forming a positive electrode 41 or a negative electrode 43 has an edge 48 projecting from at least one of opposite ends of a rolled-up electrode unit 4, the current collector edge 48 being covered with a current collecting plate 5.

The current collecting plate 5 has a plurality of circular-arc protrusions 52 projecting in a circular-arc cross section toward the current collector edge 48 and a plurality of slit pieces cut to a raised form toward the current collector edge 48, the circular-arc protrusions 52 being welded to the current collector edge 48 while biting into the current collector edge 48 along with the slit pieces 53. The current collecting plate 5 is connected to one of a pair of electrode terminal portions.

With the nonaqueous electrolyte secondary cell of the present invention, the current collecting plate 5 is pressed against the current collector edge 48 of the rolled-up electrode unit 4, whereby each circular-arc protrusion 52 is caused to bite into the current collector edge 48, forming on the current collector edge 48 a cylindrical junction shaped in conformity with the shape of surface of the protrusion 52. The junction has a large area than when the protrusion is V-shaped in cross section. The slit pieces 53 also bite deep into the current collector edge 48, resulting in a satisfactory state of contact between the collecting plate 5 and the current collector edge 48 at regions other than the welds.

Accordingly, the collecting plate 5 can be joined to the current collector edge 48 over increased areas of contact by irradiating the junctions of the circular-arc protrusions 52 and the current collector edge 48 with a 15 laser beam or electron beam and thereby welding the collecting plate 5 to the current collector edge 48. This results in reduced contact resistance and high current collecting performance.

The junction of each protrusion 52 of the current collecting plate 5 and the current collector edge 48 has its central portion positioned at an angle of 90 degrees or an angle approximate thereto with the direction of projection of the beam. This permits the laser beam or electron beam to act effectively on the junction for welding, whereby a high weld strength is available due to an increased joint area.

Stated more specifically, the current collecting plate 5 comprises a disklike body 51 having the circular-arc protrusions 52 and the slit pieces 53 formed radially and opposed to the current collector edge 48, and a striplike lead portion 55 extending from an edge portion of the disklike body 51 and joined at an outer end thereof to the electrode terminal portion. In this specific construction, the current produced by the rolled-up electrode unit 4 is collected by the collecting plate 5 and flows to the electrode terminal portion via the lead portion 55.

Stated more specifically, each of the slit pieces 53 is in contact with the current collector edge 48 over a length at least 0.5 times the radius of the current collecting plate 5. This provides a sufficiently wide area of contact between the current collecting plate 5 and the current collector edge 48 for high current collecting performance.

Each of the slit pieces 53 projects toward the current collector edge 48 over a length at least 1.0 times to not greater than 1.5 times the length of projection of the circular-arc protrusion 52. This enables the protrusion 52 to come into contact with the current collector edge 48 over a wide area, while the slit piece 53 bites into the current collector edge 48 to a sufficient depth.

The current collecting plate 5 can be made from Cu, Al, Ni, SUS, Ti or an alloy of such metals. The cell thus provided is excellent in corrosion resistance to the nonaqueous electrolyte and in electric conductivity.

Even when the rolled-up electrode unit of the cell of the invention comprises a very thin current collector, the current collector edge can be held in contact with the collecting plate over increased areas, while the cell can be provided with high productivity.
Construction for Fulfilling the Second Object The present invention provides a cylindrical secondary cell comprising a positive electrode 41 and a negative electrode 43 each in the form of a strip and rolled up into a spiral form with a separator 42 interposed between the electrodes and impregnated with a nonaqueous electrolyte to obtain a rolled-up electrode unit 4, and a cylindrical cell can 1 having the rolled-up electrode unit 4 accommodated therein, the cell being adapted to deliver electric power generated by the rolled-up electrode unit 4 to the outside via a pair of electrode terminal portions.

The positive electrode 41 and the negative electrode 43 each comprise a striplike current collector and an active substance coating the current collector, each of the electrodes having a portion coated with the active substance and extending longitudinally of the current collector, and an uncoated portion not coated with the active substance and formed along an edge of the current collector.

The uncoated portion projects from at least one of axially opposite ends of the rolled-up electrode unit 4 to provide a cylindrical projection 40, which is covered with a current collecting plate 6 made of a metal. The current collecting plate 6 comprises a top plate 61 in contact with an end face of the cylindrical projection 40 and a skirt portion 62 in contact with at least a portion of an outer peripheral surface of the cylindrical projection 40. The current collecting plate 6 is connected to one of the electrode terminal portions by a lead member 63.

With the cylindrical secondary cell of the invention described, the end face of the cylindrical projection 40 of the rolled-up electrode unit 4 and the inner surface of the top plate 61 of the current collecting plate 6 are in contact with each other, and the outer peripheral surface of the cylindrical projection 40 and the inner peripheral surface of the skirt portion 62 of the collecting plate 6 are also in contact with each other, with the result that the contact resistance between the electrode of the unit 4 and the collecting plate 6 is low, consequently giving reduced internal resistance to the cell and permitting the cell to exhibit high power characteristics.

In joining the outermost peripheral portion of top plate 61 of the collecting plate 6 to the portion of electrode edge positioned at the outermost peripheral portion of the electrode unit 4 in the step of laser welding of the collecting plate 6 as fitted over the cylindrical projection 40 of the electrode unit 4, the outer peripheral surface of the cylindrical projection 40 is covered with the skirt portion 62 of the collecting plate 6. The skirt portion therefore obviates the likelihood that the electrode or separator will be exposed directly to the laser beam, preventing damage to the electrode or separator.

Furthermore, the positive electrode 41 and the negative electrode 43 forming the electrode unit 4 need only to be made each in the form of a strip having a specified width. This simplifies the fabrication process, further making it possible to give the cylindrical projection 40 of the unit 4 with an accurately finished cylindrical surface and consequently eliminating a reduction in the yield and variations in the cell performance.

Stated specifically, the top plate 61 and the skirt portion 62 of the current collecting plate 6 are joined respectively to the end face and the outer peripheral surface of the cylindrical projection 40 of the rolled-up electrode unit 4 by laser welding. This fully reduces the contact resistance between the electrode unit 4 and the collecting plate 6.

Thus, the current collecting plate can be welded to the rolled-up electrode unit without the likelihood of causing damage to the electrode or separator, so that the cylindrical secondary cell of the invention is easy to fabricate. Moreover, the reduced internal resistance of the cell assures outstanding power characteristics.

Construction for Fulfilling the Third Object

The present invention further provides a nonaqueous electrolyte secondary cell comprising an electrode unit encased in a cell can, the electrode unit comprising as superposed in layers a pair of positive and negative electrodes and a separator interposed between the electrodes and impregnated with a nonaqueous electrolyte, the cell being adapted to deliver electric power generated by the electrode unit to the outside via a pair of electrode terminal portions provided respectively at opposite ends of the cell can, the nonaqueous electrolyte secondary cell being characterized in that an edge of a current collector forming the electrode projects from at least one of opposite ends of the electrode unit, a current collecting plate being joined to the edge and having a male screw projecting from a surface of the plate toward the electrode terminal portion, the male screw being in screw-thread engagement with an internally threaded portion formed in the electrode terminal portion.

With the nonaqueous electrolyte secondary cell of the invention described, the male screw provided on the surface of the current collecting plate is driven directly in the electrode terminal portion, forming the shortest current path between the current collecting plate and the terminal portion and consequently reducing the internal resistance of the cell.

Stated more specifically, the male screw is integral with the current collecting plate. This structure has no joint between the collecting plate and the male screw and no contact resistance, consequently reducing the internal resistance of the cell.

Alternatively, a base plate is provided on the surface of the current collecting plate centrally thereof, and the male screw is provided on a surface of the base plate. With this structure, the base plate provided with the male screw is a member separate from the collecting plate, and can therefore be made from a material of low resistance different from the material of the collecting plate. With the male screw positioned centrally of the collecting plate, the average distance the current collected by the collecting plate flows before reaching the male screw is short, consequently reducing the internal resistance of the cell.

Further alternatively, the opposite ends of the electrode unit have edges of current collectors forming the respective electrodes projecting therefrom, and the current collector edges have respective current collecting plates joined thereto, the male screw projecting from one of the current collecting plates, the other current collecting plate being provided with a connecting member projecting therefrom and having elasticity so as to move toward or away from the electrode terminal portion. With this specific construction, the connecting member having elasticity is provided between the electrode terminal portion and the current collecting plate at one end of the electrode unit, so that the errors involved in assembling the electrode unit or the cell can is absorbable by the elastic deformation of the connecting member. This eliminates the need for strict dimensional management, leading to an improved cell production efficiency.

Thus, the nonaqueous electrolyte secondary cell provided by the invention has lower internal resistance than conventionally.

BRIEF DESCRIPTION OF THE DRAWINGS

FIG. 4(*b*) is an enlarged view in section taken along the line B—B in FIG. 3;

DETAILED DESCRIPTION OF EMBODIMENTS

[1] Embodiment of the Invention for Fulfilling the First Object

A lithium secondary cell embodying the invention will be described below in detail with reference to the drawings concerned.

Overall Construction

Figure 1:
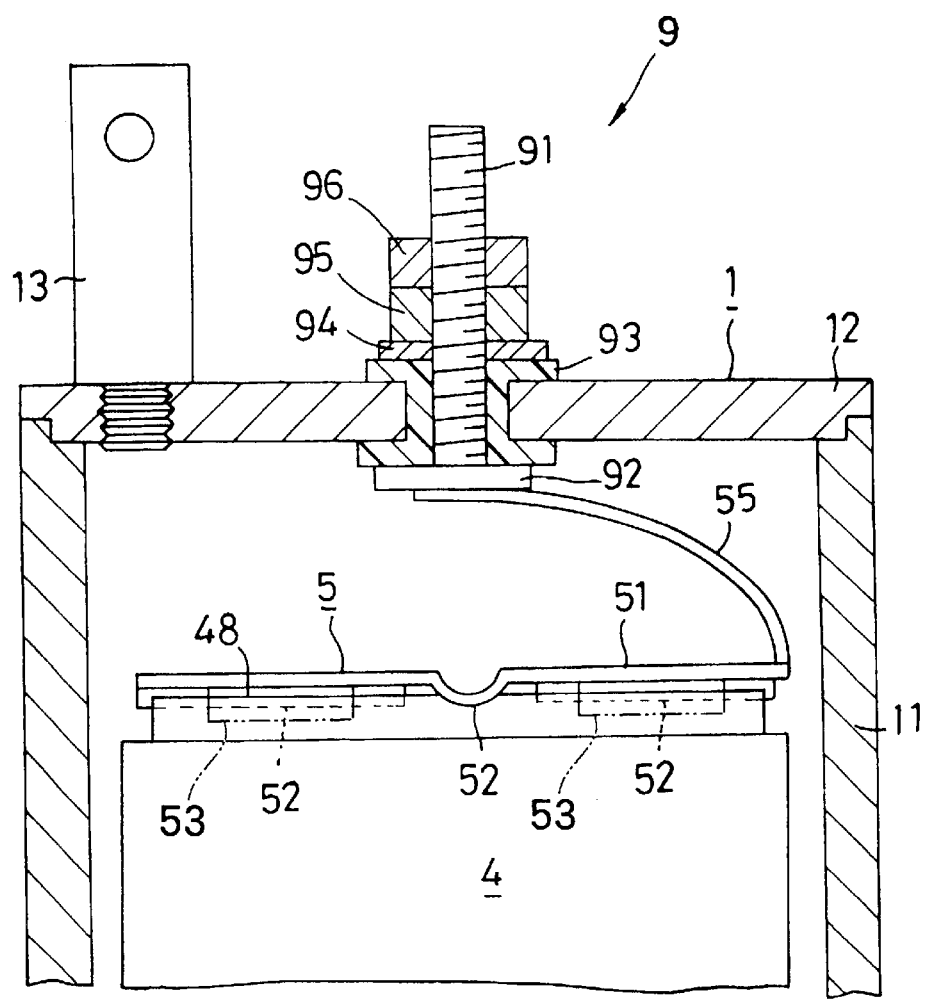
FIG. 1 is a fragmentary front view partly broken away and showing a cylindrical lithium secondary cell embodying the invention.
Figure 11:
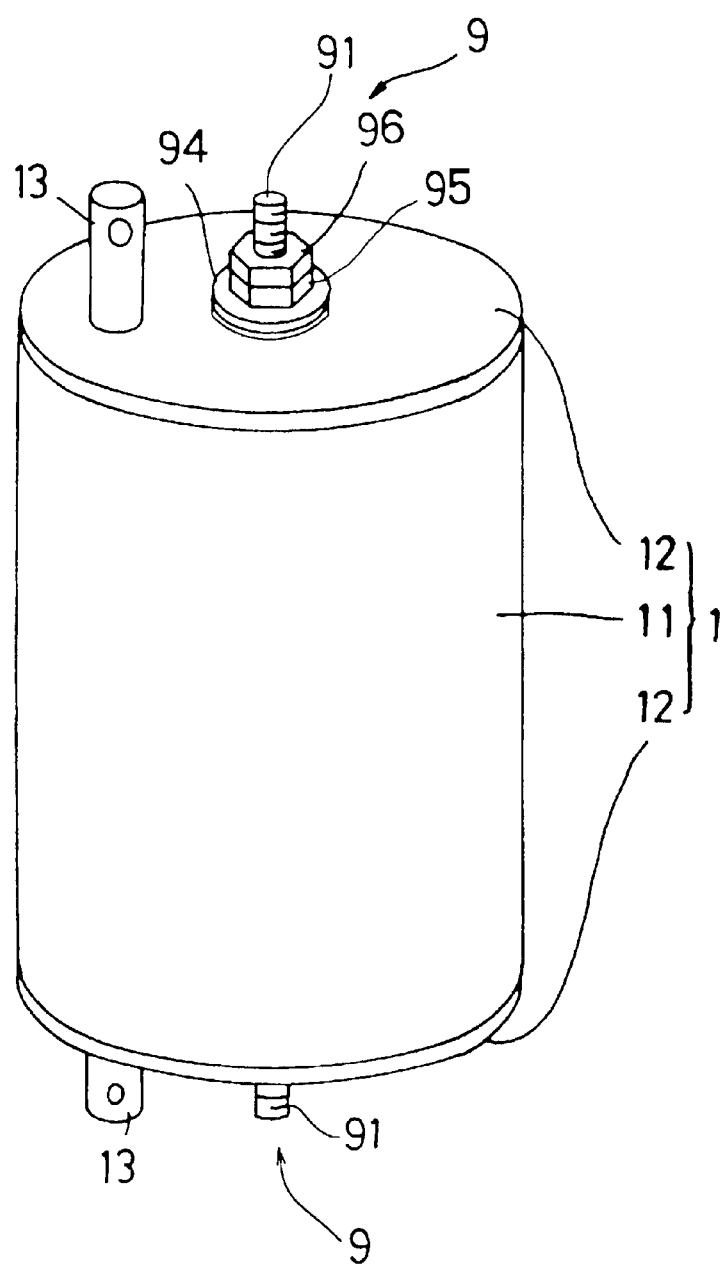
FIG. 11 is a perspective view showing the appearance of a cylindrical lithium secondary cell.
Figure 12:
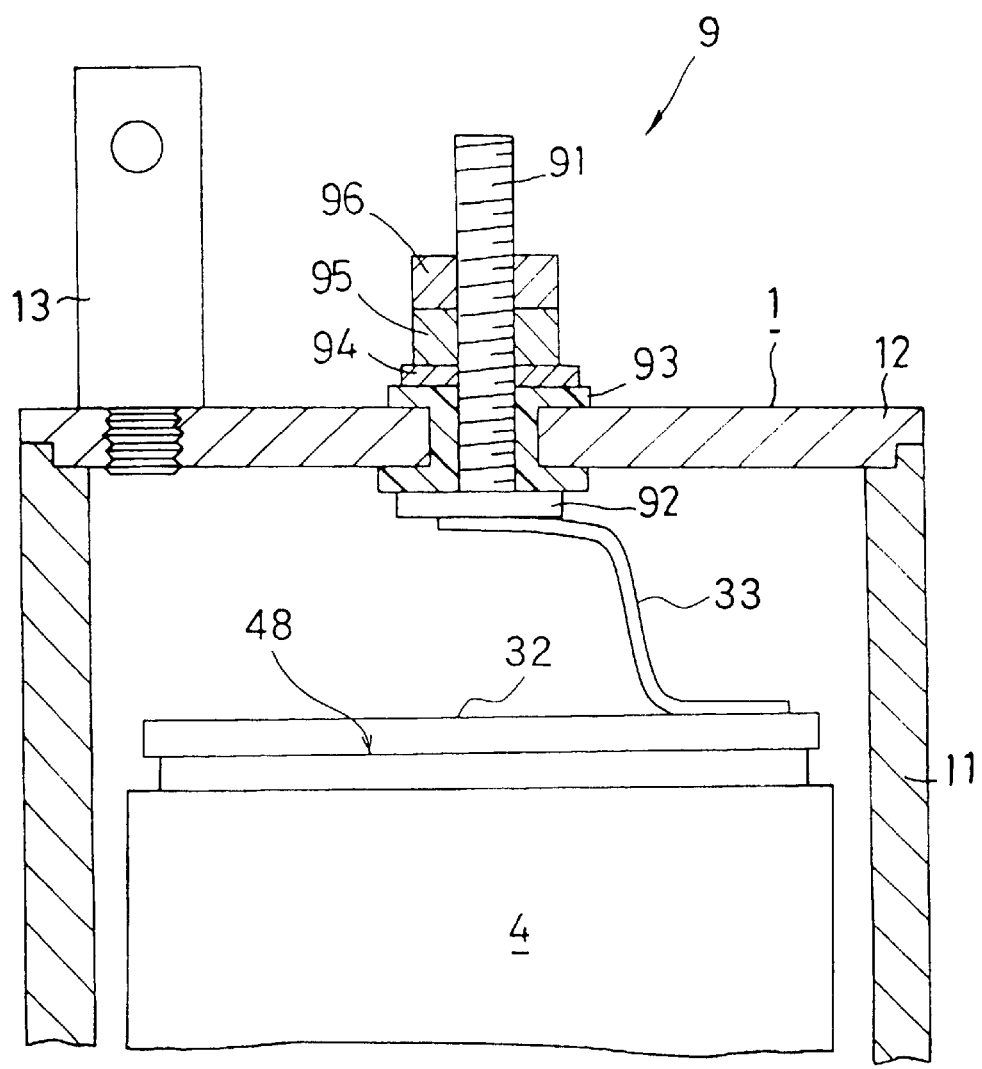
FIG. 12 is a fragmentary front view partly broken away and showing a conventional lithium secondary cell.

With reference to FIGS. 11 and 1, the lithium secondary cell of the invention comprises a cylindrical cell can 1 having a cylinder 11 and lids 12, 12 welded to the respective ends thereof, and a rolled-up electrode unit 4 encased in the can 1. A pair of positive and negative electrode terminal assemblies 9, 9 are attached to the lids 12, 12, respectively. The terminal assembly 9 has the same construction as in the prior art. Each lid 12 is provided with a gas vent valve 13.

A current collecting plate S is provided at each end of the electrode unit 4 and joined to the edge 48 of a current collector foil by laser welding. A lead portion 55 projecting from an end portion of the collecting plate 5 is welded at its outer end to a flange 92 of an electrode terminal 91 constituting the electrode terminal assembly 9 by spot welding, ultrasonic welding or laser welding.

Rolled-up Electrode Unit 4

Figure 2:
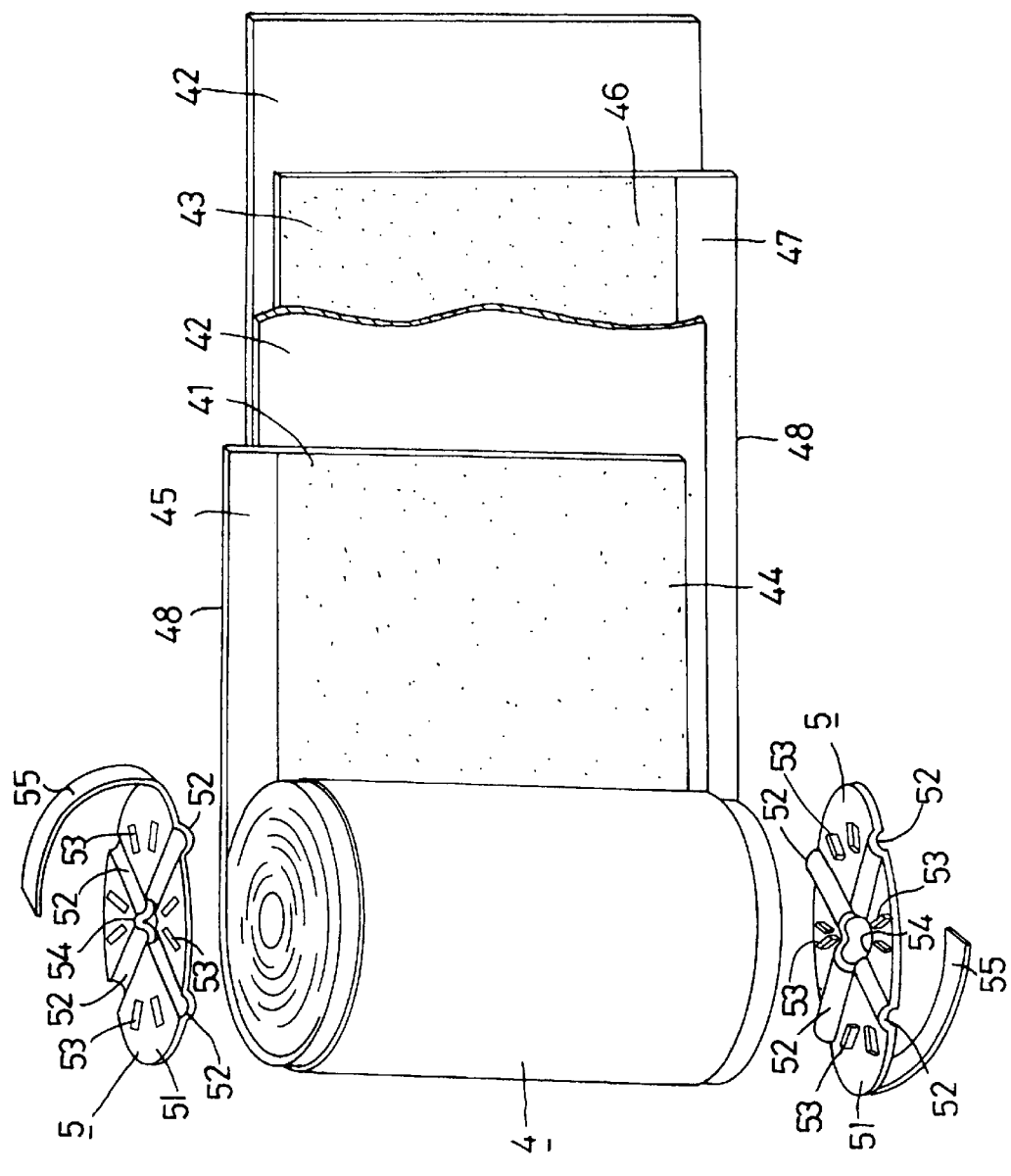
FIG. 2 is an exploded perspective view of a rolled-up electrode unit and current collecting plates.

As shown in FIG. 2, the rolled-up electrode unit 4 comprises a positive electrode 41 and a negative electrode 43 which are each in the form of a strip and which are rolled up into a spiral form with a striplike separator 42 interposed between the electrodes. The positive electrode 41 comprises a striplike current collector foil 45 in the form of aluminum foil and coated over opposite surfaces thereof with a positive electrode active substance 44 comprising a lithium containing composite oxide. The negative electrode 43 comprises a striplike current collector foil 47 in the form of copper foil and coated over opposite surfaces thereof with a negative electrode active substance 46 containing a carbon material. The separator 42 is impregnated with a nonaqueous electrolyte.

The positive electrode 41 has a portion coated with the positive electrode active substance 44 and a portion not coated with the substance. The negative electrode 43 has a portion coated with the negative electrode active substance 46 and a portion not coated with the substance.

The positive electrode 41 and the negative electrode 43 are superposed on respective separators 42, as displaced from the separator widthwise thereof, and the uncoated portions of the positive electrode 41 and the negative electrode 43 are caused to project outward beyond the opposite edges of the separator 42. The assembly is then rolled up into a spiral form, whereby the electrode unit 4 is fabricated. An edge 48 of a current collector foil of the uncoated portion of the positive electrode 41 extends outward beyond one edge of the separator 42 at one of the axially opposite ends of the electrode unit 4, while an edge 48 of a current collector foil of the uncoated portion of the negative electrode 43 extends outward beyond the other edge of the separator 42 at the other end of the unit 4.

Current Collecting Structure

With reference to FIGS. 2 to 4(b), the current collecting plate 5 comprises a disklike body 51 having a central hole 54. The body 51 is integrally provided with a plurality of (four, according to the embodiment) circular-arc protrusions 52 extending radially, arranged about the central hole 54 and projecting toward the rolled-up electrode unit 4. A plurality of (two, according to the embodiment) slit pieces 53 are formed on the body 51 between each pair of circular-arc protrusions 52, 52 to project toward the electrode unit 4. A lead portion 55 in the form of a strip is integral with an end portion of the body 51. As seen in FIG. 4(a), the protrusion 52 of the collecting plate 5 is circular-arc, i.e., semicircular, in cross section orthogonal to a radial line of the body 51.

Fabrication Process

Figure 3:
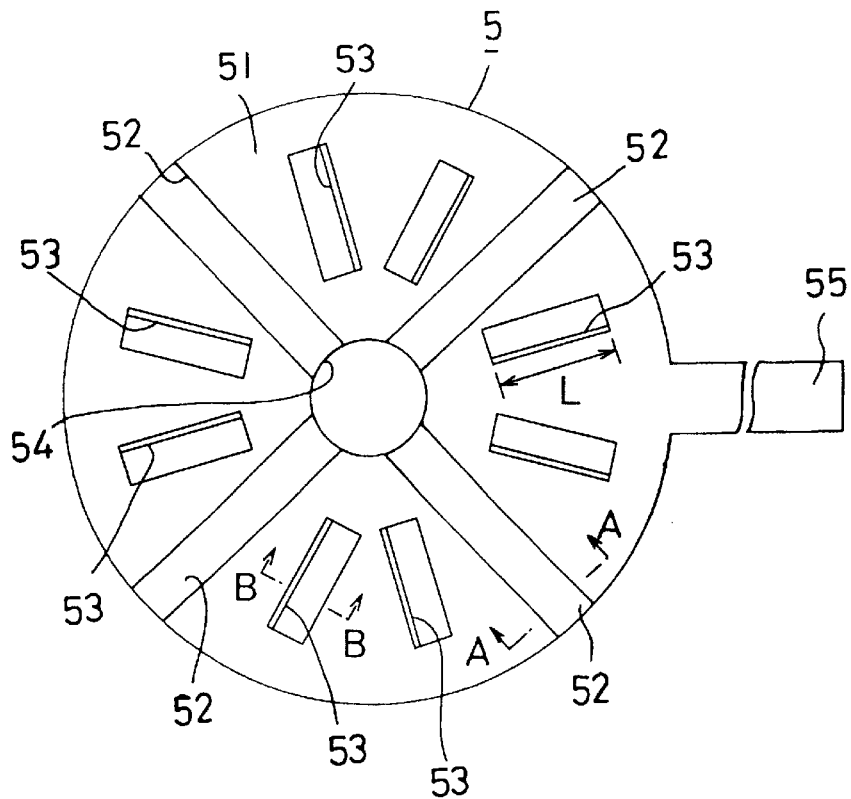
FIG. 3 is a plan view of the current collecting plate.
Figure 4:
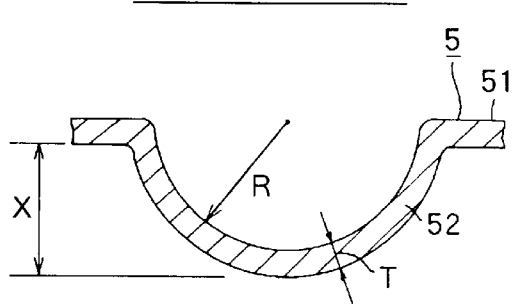
FIG. 4(*a*) is an enlarged view in section taken along the line A—A in FIG. 3.
Figure 4:
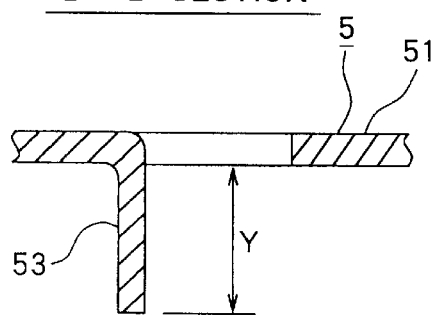
Figure 5:
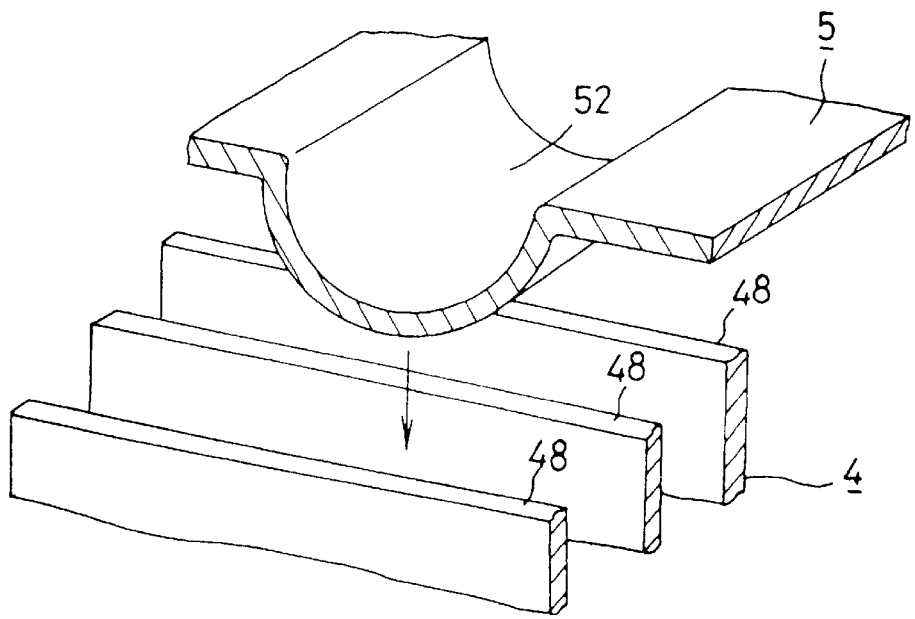
FIG. 5 is a perspective view showing the step of pressing a circular-arc protrusion of the collecting plate against the rolled-up electrode unit.
Figure 6:
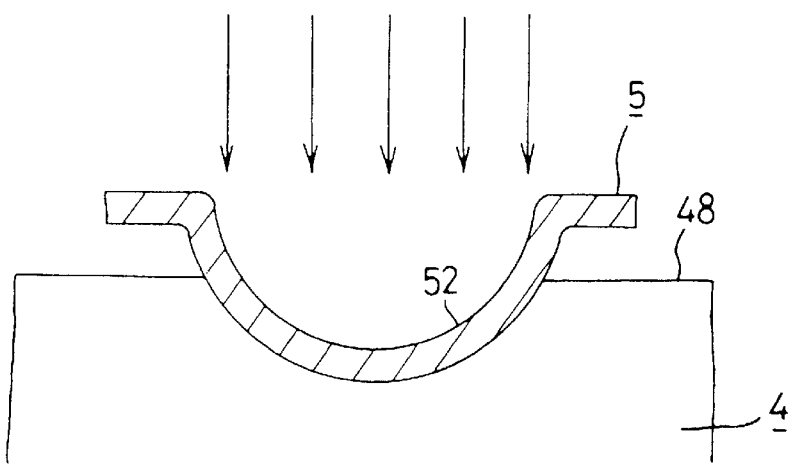
FIG. 6 is a sectional view showing the circular-arc protrusion of the collecting plate biting into an edge of a current collector foil.
Figure 7:
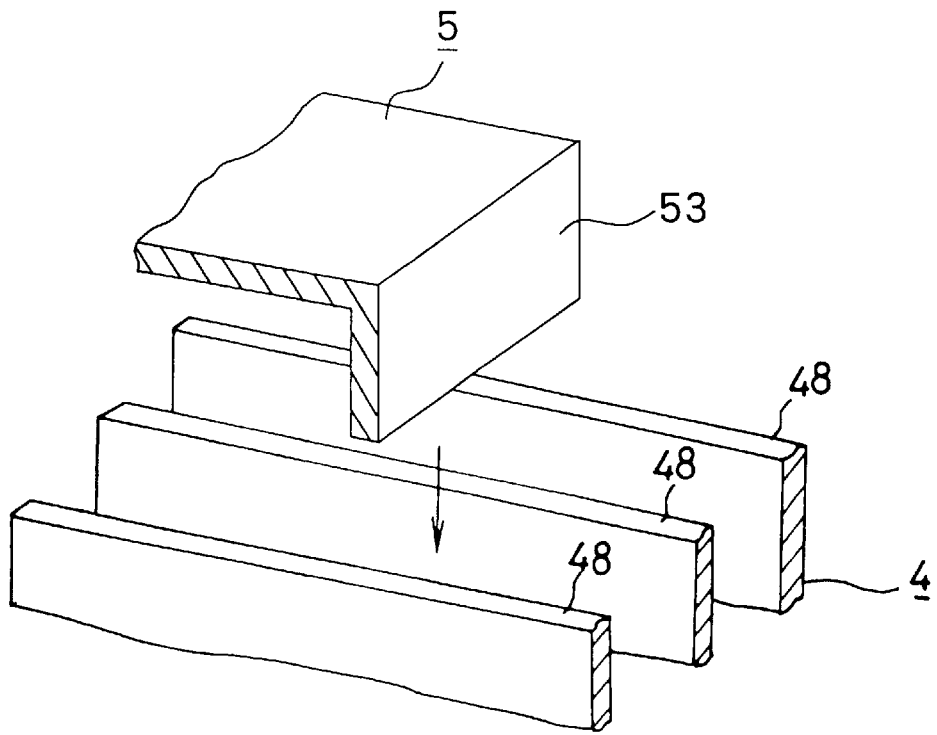
FIG. 7 is a perspective view showing the step of pressing a slit piece of the collecting plate against the rolled-up electrode unit.

Prepared first are a cell can 1 and electrode terminal assemblies 9 which are shown in FIG. 1, a rolled-up electrode unit 4 shown in FIG. 2, and current collecting plates 5 which are shown in FIG. 3. The collecting plates 5 are then pressed against the edges 48 of the current collector foil at the respective ends of the electrode unit 4 as shown in FIGS. 5 and 7. This forces each circular-arc protrusion 52 of the collecting plate 5 into the edge 48 of the current collector foil of the electrode unit 4 as shown in FIG. 6, forming a cylindrical junction between the protrusion 52 and the edge 48 of the current collector foil.

Figure 8:
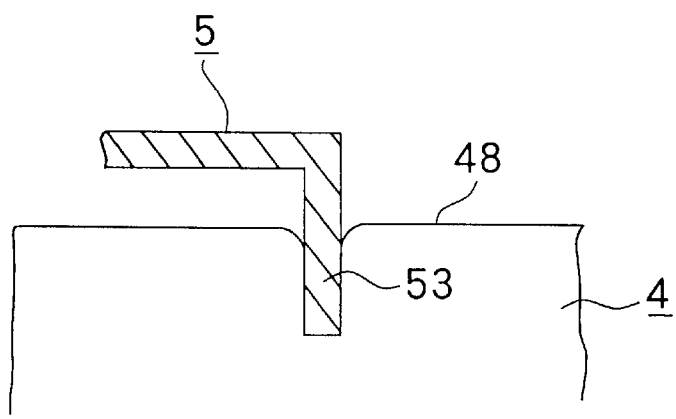
FIG. 8 is a sectional view showing the slit piece of the collecting plate biting into an edge of a current collector foil.

Further each slit piece 53 of the collecting plate 5 bites deep into the edge 48 of the current collector foil of the unit 4 in pressing contact therewith as shown in FIG. 8. In this state, a laser beam is projected onto the inner surface of the protrusion 52 of the collecting plate 5 for laser welding as indicated by arrows in FIG. 6. Consequently, the protrusion 52 of the collecting plate 5 and the edge 48 of the current collector foil of the electrode unit 4 are joined to each other over a large area of contact, with each slit piece 53 held in pressing contact with the edge 48 of the current collector foil as seen in FIG. 8.

With the cylindrical lithium secondary cell described, the current collecting plate 5 is joined to the edge 48 of the current collector foil over a large area of contact by the weld of each circular-arc protrusion 52 and the edge 48 of the current collector foil, with each slit piece 53 biting into the edge 48 of the current collector foil in a region other than the weld to ensure satisfactory contact. This reduces the resistance of contact between the collecting plate 5 and the rolled-up electrode unit 4. Moreover, the plurality of slit pieces 53 formed in the collecting plate 5 collect current over the entire area of the edge 48 of the current collector foil to achieve high current collection performance.

The junction of the protrusion 52 of the collecting plate 5 and the edge of the current collector foil has its central portion positioned at an angle of 90 degrees or an angle approximate thereto with the direction of projection of the laser beam, thereby permitting the laser beam to act effectively on the junction for welding and consequently giving a high weld strength due to an increased joint area.

Cells A to P of the invention and comparative cell Q were prepared in the following manner.

Invention Cell A

For invention cell A, a rolled-up electrode unit 4 was prepared by arranging in superposed layers a positive electrode 41 obtained by coating an aluminum current collector foil 45 having a thickness of 20 μm with a positive electrode active substance 44 comprising $LiCoO_2$, a negative electrode 43 obtained by coating a copper current collector foil 47 having a thickness of 20 μm with a negative electrode active substance 46 comprising graphite and separators 42 in the form of an ion-permeable finely porous membrane of polypropylene, and rolling up these components into a spiral form as shown in FIG. 2. The positive electrode 41 and the negative electrode 43 each had an uncoated portion of predetermined width at a widthwise end thereof.

A current collecting plate 5 of aluminum was prepared which comprised a disklike body 51 having a radius of 28 mm, a thickness of 1 mm, a plurality of circular-arc protrusions 52 formed radially therein, and a plurality of slit pieces 53 formed radially thereon. The collecting plate 5 was fitted over the edge 48 of the positive electrode current collector foil of the electrode unit 4 and pressed thereagainst with a jig from above. The circular-arc protrusions 52 of the collecting plate 5 shown in FIGS. 3 and 4(a) were 1 mm in wall thickness T and 1.4 mm in inside radius R (i.e., the length X of projection from the disklike body rear surface). Further the slit pieces 53 shown in FIGS. 3 and 4(b) were 14 mm in the length L of contact thereof with the edge 48 of the current collector foil and 2.1 mm in the length Y of projection from the disklike body rear surface.

In this state, a laser beam was projected onto the inner surface of each protrusion 52 of the plate 5 as shown in FIG. 6 to weld the outer peripheral surface of the protrusion 52 to the edge 48 of the current collector foil. A current collecting structure for the positive electrode was then made by joining the outer end of an aluminum lead to the rear face of an aluminum electrode terminal by laser welding. A negative electrode current collecting structure was prepared in the same manner as above except that the electrode terminal, current collecting plate and lead piece used were made from nickel.

The rolled-up electrode unit 4 was thereafter encased in a cylinder 11, and a lid 12 having an electrode terminal assembly 9 mounted thereon is fixedly welded to each open end of the cylinder 11. An ester-type organic electrolyte was subsequently placed into the cylinder, i.e., can 1, to fabricate invention cell A having a rated electric power capacity of 180 Wh.

Invention Cells B–J

Cells B to J of the invention were prepared in the same manner as invention cell A except that the slit pieces 53 of the current collecting plate 5 had a length (contact length L) of 9 mm, 11 mm, 12 mm, 14 mm, 16 mm, 18 mm, 19 mm, 22 mm or 24 mm. Incidentally, invention cell E had the same construction as invention cell A.

Invention cells K–P

Invention cells K–P were prepared in the same manner as invention cell A except that the slit pieces 53 of the current collecting plate 5 were 1.2 mm, 1.4 mm, 1.8 mm, 2.1 mm, 2.2 mm or 2.4 mm in length Y of projection. Incidentally, invention cell N had the same construction as invention cell A.

Comparative Cell Q

Comparative cell Q was prepared in the same manner as invention cell A except that the current collecting plate 5 had circular-arc protrusions 52 only, with no slit pieces 53 formed.

Comparison of Power Characteristics

Invention cells A to P and comparative cell Q were tested for power characteristics as will be described below for the comparison of power characteristics.

(a) Comparison Between Invention Cell A and Comparative Cell Q

For an power characteristics test, invention cell A and comparative cell Q were charged at 0.125 C to 4.1 V, then discharged at 0.5 C to a depth of discharge of 40% and thereafter checked for power characteristics at a current value of 4 C for a discharge period of 10 seconds. Table 1 shows the result. The power density was determined by calculating the power value based on the voltage-current characteristics under the above conditions and dividing the result by the weight of the cell.

TABLE 1

| | Power density [W/kg] |
|---|---|
| Cell A (invention) | 620 |
| Cell Q (comparative) | 594 |

Table 1 reveals that invention cell A is higher than comparative cell Q in power characteristics. This is thought attributable to the slit pieces 53 provided on each current collecting plate 5 of invention cell A and serving to improve the state of contact between the collecting plate 5 and the edge 48 of the current collector foil of the rolled-up electrode unit 4 and result in a reduction in contact resistance.

(b) Comparison of Invention Cells B–J

Figure 9:
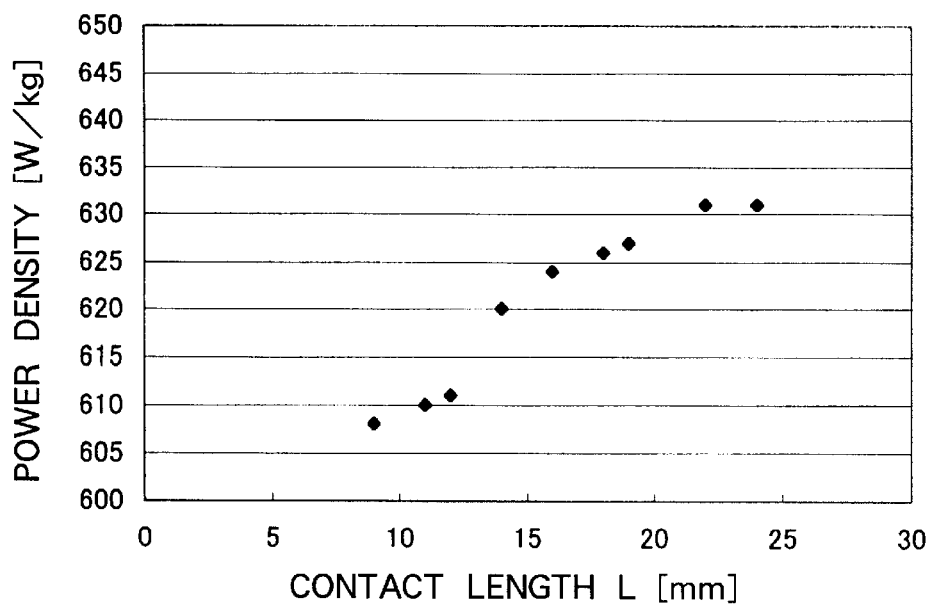
FIG. 9 is a graph showing the relationship between the contact length of slit piece of the collecting plate with the power density.

Next, power characteristics of invention cells B to J were compared. Table 2 shows the results. FIG. 9 shows a graph prepared from the results of table 2.

TABLE 2

| Cell | Length of contact [mm] | Power density [W/kg] |
|---|---|---|
| B | 9 | 608 |
| C | 11 | 610 |
| D | 12 | 611 |
| E(A) | 14 | 620 |
| F | 16 | 624 |
| G | 18 | 626 |
| H | 19 | 627 |
| I | 22 | 631 |
| J | 24 | 631 |

Table 2 and FIG. 9 reveal that the power density reduces markedly when the length L of contact between each slit piece 53 of the collecting plate 5 and the edge 48 of the current collector foil is smaller than 0.5 times (14 mm) the radius (28 mm) of the disklike body 51. This appears attributable to a reduced area of contact between the slit piece 53 and the edge of the current collector foil, markedly decreasing the effect to lower the resistance to current collection. Accordingly, it is desired that the slit pieces 53 of the collecting plate 5 have a contact length L at least 0.5 times the radius of the disklike body 51.

(c) Comparison of Invention Cells K–P

Figure 10:
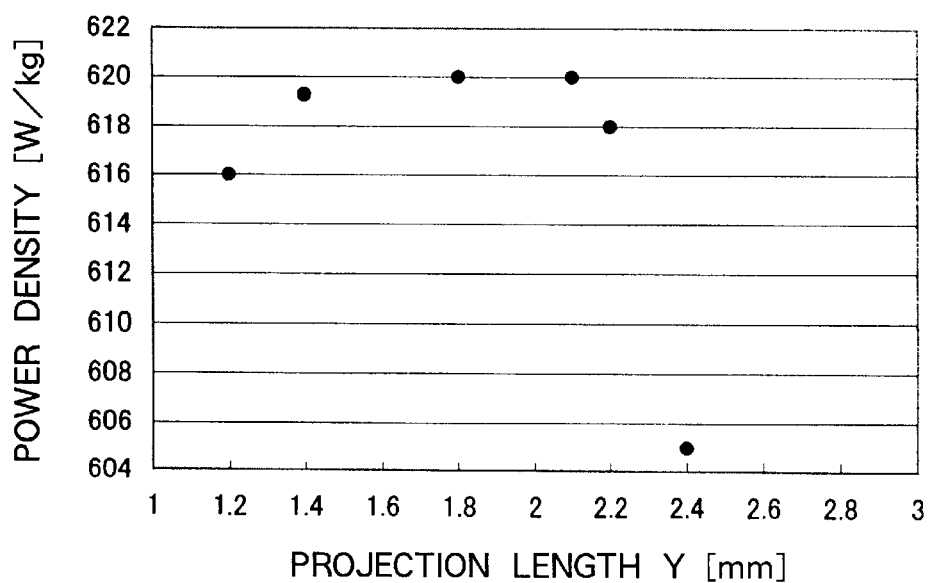
FIG. 10 is a graph showing the relationship between the length of projection of the slit piece of the collecting plate with the power density.

The power characteristics of invention cells K to P were further compared. Table 3 shows the results. FIG. 10 shows a graph prepared from the results of Table 3.

TABLE 3

| Cell | Projection length [mm] | Power density [W/kg] |
|---|---|---|
| K | 1.2 | 616 |
| L | 1.4 | 619 |
| N | 1.8 | 620 |
| N(A) | 2.1 | 620 |
| O | 2.2 | 618 |
| P | 2.4 | 605 |

Table 3 and FIG. 10 reveal that the power density decreases markedly if the projection length Y of each slit pieces 53 of the collecting plate 5 is greater than 1.5 times (2.1 mm) the projection length X (1.4 mm) of the circular-arc protrusion 52, because the excessively large projection length of the slit piece 53 prevents the circular-arc protrusion 52 from coming into full contact with the edge of the current collector foil to result in unsatisfactory laser welding joint and increased contact resistance.

Further the power density decreases markedly if the projection length Y of each slit pieces 53 of the collecting plate 5 is smaller than 1.0 times (1.4 mm) the projection length X (1.4 mm) of the circular-arc protrusion 52. The reason is that the slit piece 53 fails to bite deep into the edge of the current collector foil because of too small a projection length, failing to ensure a fully improved state of contact between the collecting plate 5 and the edge 48 of the current collector foil. Accordingly it is desirable that the projection length Y of the slit pieces 53 of the collecting plate 5 be at least 1.0 times to not greater than 1.5 times the projection length X of the circular-arc protrusion 52.

Incidentally, not only the lead portion 55 shown in FIG. 1, but various other known structures are usable for connecting the current collecting plate 5 to the electrode terminal assembly 9. Although the laser beam is used for welding the collecting plate in the foregoing embodiment, the use of the beam is not limitative but an electron beam is also usable for welding.

[2] Embodiment of the Invention for Fulfilling the Second Object

A cylindrical lithium secondary cell embodying the invention will be described below in detail with reference to the drawings concerned.

Figure 14:
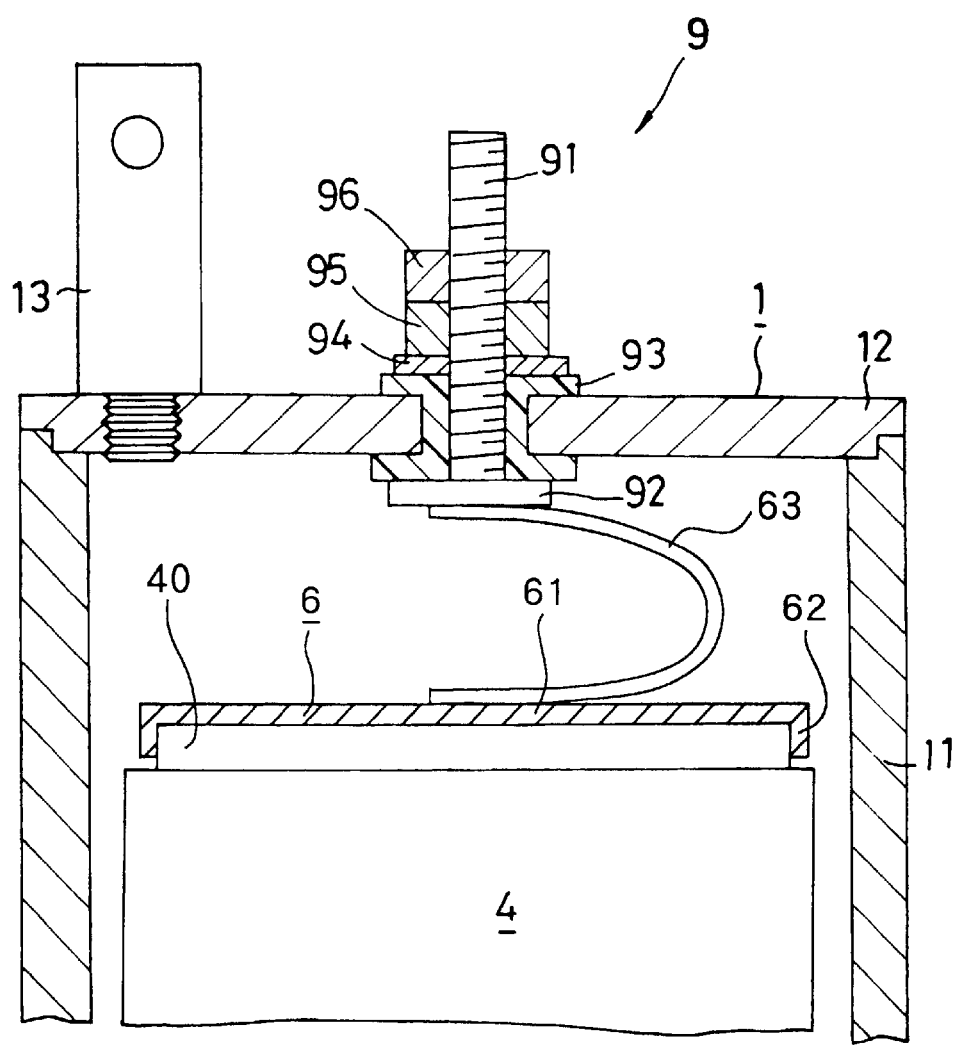
FIG. 14 is a front view partly broken away of a cylindrical lithium secondary cell embodying the invention.

With reference to FIG. 14, the cylindrical lithium secondary cell of the invention comprises a cylindrical can 1 having a cylinder 11 and lids 12, 12 welded to the respective ends thereof, and a rolled-up electrode unit 4 encased in the can 1. A pair of positive and negative electrode terminal assemblies 9, 9 are attached to the lids 12, 12, respectively. The terminal assembly 9 has the same construction as in the prior art. Each lid 12 is provided with a gas vent valve 13.

A current collecting plate 6 is provided at each end of the electrode unit 4 and joined to a cylindrical projection 40 by laser welding. A lead member 63 has a base end joined to the upper surface of the collecting plate 6 by spot welding, and an outer end joined by spot welding to the rear face of a flange 92 of an electrode terminal 91 constituting the electrode terminal assembly 9.

Figure 15:
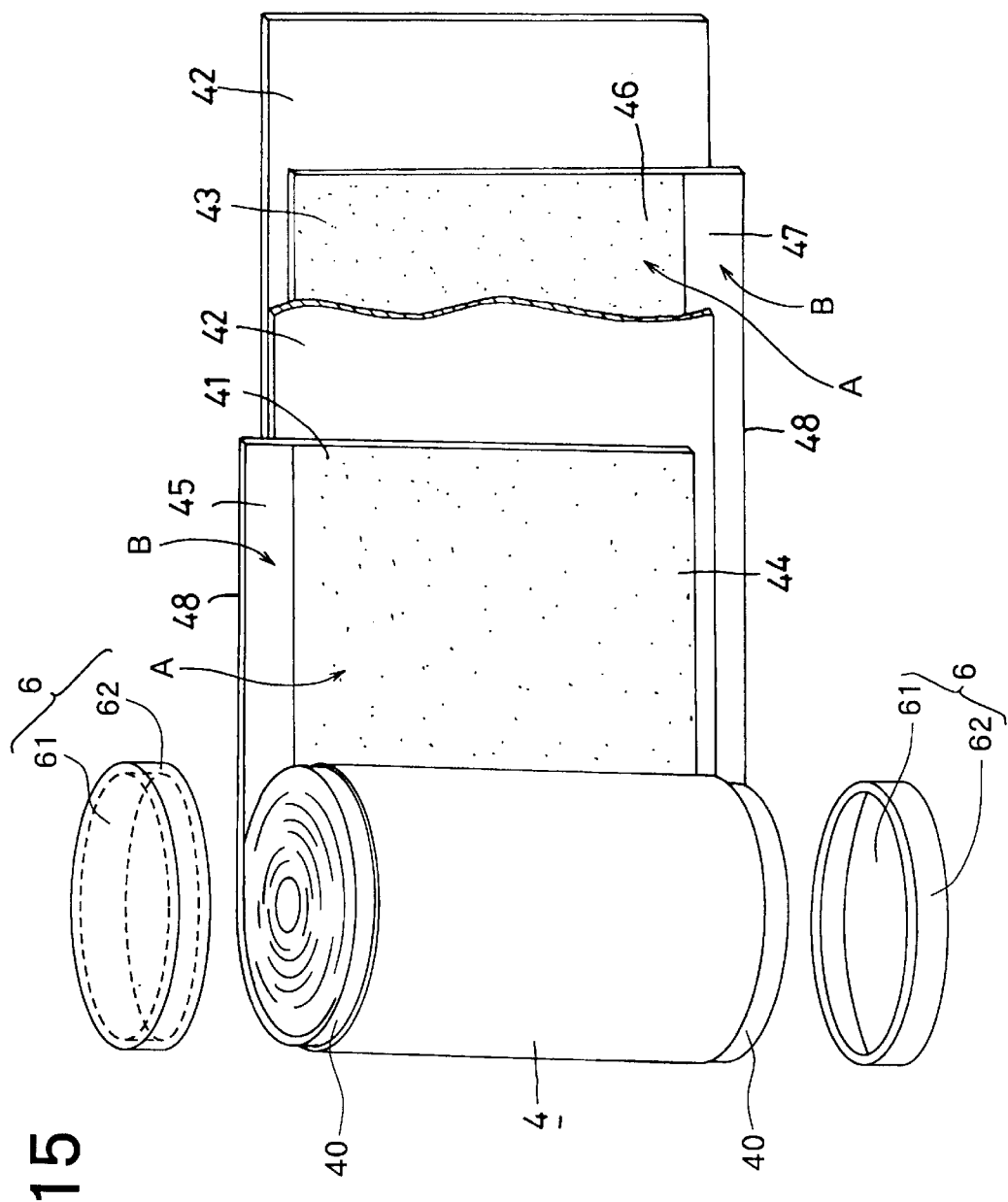
FIG. 15 is an exploded perspective view of a rolled-up electrode unit and current collecting plates incorporated into the cell.

As shown in FIG. 15, the rolled-up electrode unit 4 comprises a positive electrode 41 and a negative electrode 43 which are each in the form of a strip and which are rolled up into a spiral form with a striplike separator 42 interposed between the electrodes. The positive electrode 41 comprises a striplike current collector foil 45 in the form of aluminum foil and coated over opposite surfaces thereof with a positive electrode active substance 44 comprising a lithium containing composite oxides. The negative electrode 43 comprises a striplike current collector foil 47 in the form of copper foil and coated over opposite surfaces thereof with a negative electrode active substance 46 containing a carbon material. The separator 42 is impregnated with a nonaqueous electrolyte.

The positive electrode 41 has a portion A coated with the positive electrode active substance 44 and a portion B not coated with the substance and extending along an edge 48 of a current collector foil. The negative electrode 43 has a portion A coated with the negative electrode active substance 46 and a portion B not coated with the substance and extending along an edge 48 of a current collector foil.

The positive electrode 41 and the negative electrode 43 are superposed on respective separators 42, as displaced from the separators widthwise thereof, and the uncoated portions of the positive electrode 41 and the negative electrode 43 are caused to project outward beyond the opposite edges of the separator 42. The assembly is then rolled up into a spiral form, whereby the electrode unit 4 is fabricated. The edge 48 of the current collector foil of the uncoated portion of the positive electrode 41 extends outward beyond one edge of the separator 42 at one of the axially opposite ends of the electrode unit 4, providing the cylindrical projection 40 at the positive electrode side. The edge 48 of the current collector foil of the uncoated portion of the negative electrode 43 extends outward beyond the other edge of the separator 42 at the other end of the unit 4, providing the cylindrical projection 40 at the negative electrode side.

As shown in FIGS. 14 and 15, the current collecting plate 6 comprises a disklike top plate 61 and a cylindrical skirt portion 62. The inner surface of the top plate 61 is in intimate contact with the outer end face of the cylindrical projection 40 and is joined thereto by laser welding, and the inner peripheral surface of the skirt portion 62 is in intimate contact with the outer peripheral surface of the projection 40 and is joined thereto by laser welding. The outer surface of the collecting plate 6 is connected by the lead member 63 to the flange 92 of the electrode terminal assembly 92.

In fabricating the cylindrical lithium secondary cell of the present invention, a separator 42, negative electrode 43, separator 42 and positive electrode 41 are placed over one another in superposed layers first, and wound up into a spiral form to obtain the rolled-up electrode unit 4 as shown in FIG. 15. A current collecting plate 6 for the positive electrode is prepared from aluminum, while a negative electrode current collecting plate 6 is made from nickel.

Next, the cylindrical projections 40, 40 of the rolled-up electrode unit 4 are joined to the respective collecting plates 6 by laser welding. For laser welding, a laser beam is projected along radial paths on the surface of the top plate 61 of each collecting plate 6 as fitted over the projection 40 of the electrode unit 4, and on the outer peripheral surface of the skirt portion 62 of the plate 6 while making one turn around the periphery. A lead member 63 is joined at its base end to the surface of each collecting plate 6 by spot welding.

The rolled-up electrode unit 4 is thereafter placed into the cylinder 11 of a cell can 1, and the outer end of the lead member 63 extending from each collecting plate 6 is spot-welded to the rear face of a flange 92 of an electrode terminal 91. An electrode terminal assembly 9 is attached to each of lids 12, and the first nut 95 is tightened up to give satisfactory liquid-tightness to the insulating packing 93.

Figure 16:
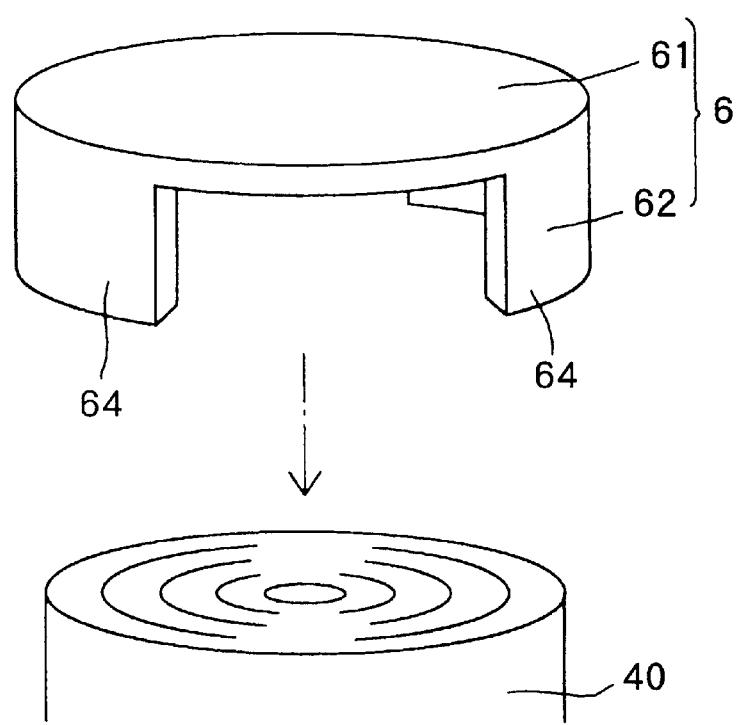
FIG. 16 is a perspective view of another example of current collecting plate.
Figure 17:
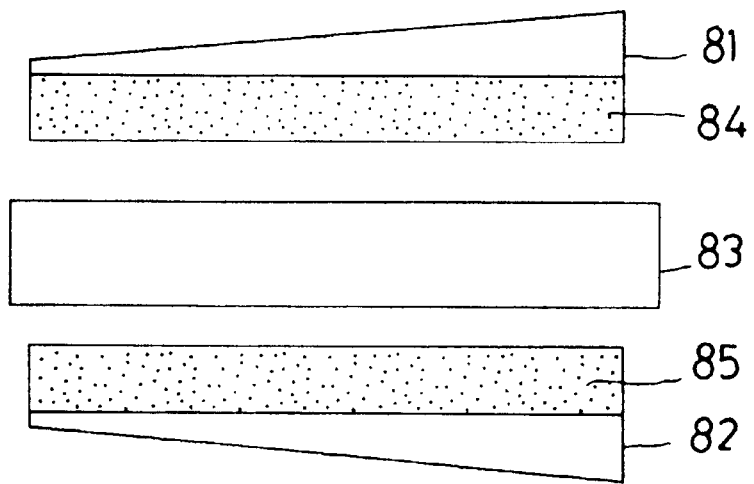
FIG. 17 is a development showing the positive electrode, separator and negative electrode of another conventional secondary cell.
Figure 18:
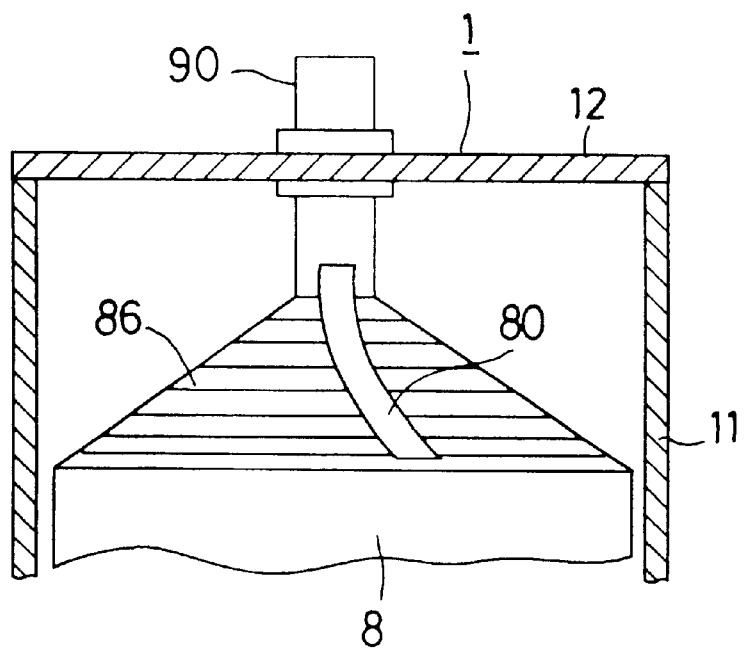
FIG. 18 is a fragmentary front view partly broken away and showing the conventional secondary cell.

Each lid 12 is then joined to the opening f the cylinder 11 by laser welding, an electrolyte is poured into the can 1, and a gas vent valve 13 is thereafter screwed into each lid 12 as shown in FIG. 14 for fixing, whereby a cylindrical lithium secondary cell of the invention is completed. Alternatively, a plurality of circular-arc pieces 64 may be provided on a disklike top plate 61 to form a skirt portion 62 as shown in FIG. 16 to obtain a current collecting plate 6.

Preparation of Positive Electrode

A positive electrode composition was prepared by mixing together a powder of $LiCoO_2$ serving as a positive electrode active substance and having a mean particle size of 5 μm and artificial graphite serving as an electrically conductive agent in a ratio by weight of 9:1. Next, polyvinylidene fluoride serving as a binder was dissolved in N-methyl-2-pyrrolidone (NMP) to prepare an NMP solution. The composition and the NMP solution were then mixed together so that the ratio of the composition to the polyvinylidene fluoride would be 95:5 by weight to prepare a slurry, which was then applied to opposite surfaces of aluminum foil serving as a positive electrode current collector foil and having a thickness of 20 μm with a doctor blade method, followed by drying in a vacuum at 15020 C. for 2 hours to prepare a positive electrode 41 shown in FIG. 15.

Preparation of Negative Electrode

Carbon lumps (d002=3.356A; Lc>1000) were pulverized by forcing an air stream thereagainst to obtain a carbon powder. Polyvinylidene fluoride serving as a binder was dissolved in NMP to prepare an NMP solution. The carbon powder and the NMP solution were then kneaded so that the ratio of the powder to the polyvinylidene fluoride would be 85:15 by weight to prepare a slurry, which was then applied to opposite surfaces of copper foil serving as a negative electrode current collector foil and having a thickness of 20 μm with a doctor blade method, followed by drying in a vacuum at 150° C. for 2 hours to prepare a negative electrode 43 shown in FIG. 15.

Preparation of Electrolyte

An electrolyte was prepared by dissolving $LiPF_6$ in an amount of 1 mol/L in a solvent obtained by mixing together ethylene carbonate and diethyl carbonate in a ratio by volume of 1:1.

Assembly of Invention Cells

An ion-permeable finely porous membrane of polypropylene serving as a separator was wound around a spool with a diameter of 10 mm several turns, four sheets, i.e., a sheet of the separator, the positive electrode, a sheet of the separator and the negative electrode, as place one over another in superposed layers were wound up many turns into a spiral form so as to interpose the separator between the positive and negative electrodes, and the spool was finally remove to prepare a rolled-up electrode unit 4 shown in FIG. 15. A cylindrical lithium secondary cell of the invention was assembled using the electrode unit 4. The cell was 57 mm in outside diameter and 220 mm in length.

Two kinds of current collecting plates 6 were prepared for use over the cylindrical projections 40 of the electrode unit 4: i.e., collecting plates 6 having a skirt portion 62 comprising two separate circular-arc pieces 64, 64 as shown in FIG. 16, and collecting plates 6 having a cylindrical skirt portion 62 as shown in FIG. 15. Fabricated in the manner described above were invention cell 1 having the collecting plates 6 of FIG. 16, and invention cell 2 having the collecting plates 6 of FIG. 15. In invention cell 1, the skirt portion 62 of the plate 6 covered 30% of the entire area of the outer peripheral surface of the cylindrical projection 40. In invention cell 2, the skirt portion 62 of the collecting plate 6 covered 90% of the entire area of the outer peripheral surface of the cylindrical projection 40.

Assembly of Comparative Cell

Figure 13:
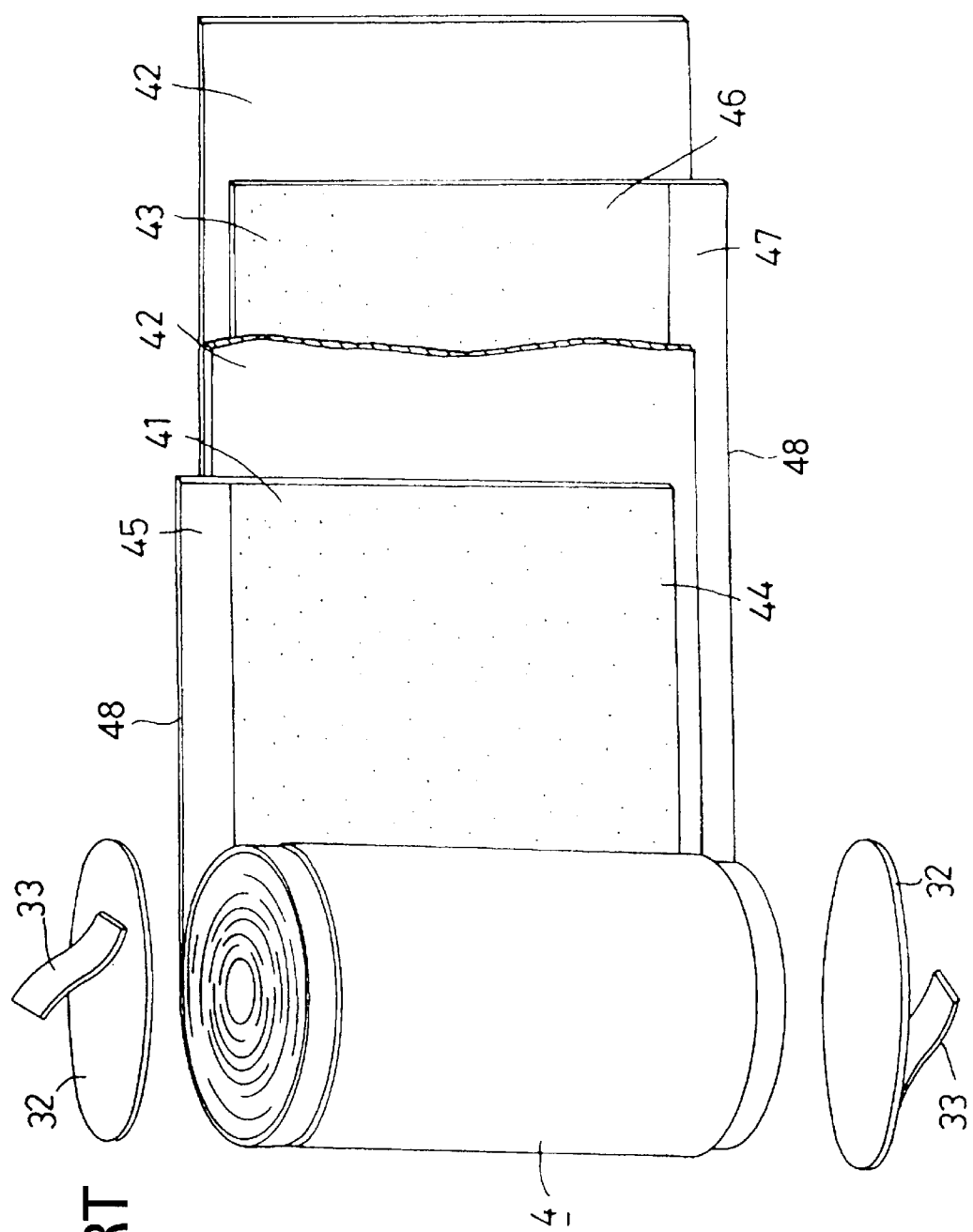
FIG. 13 is a perspective view partly in development of a rolled-up electrode unit for use in the conventional cell.

A comparative cell was fabricated in the same manner as the invention cell described except that the disklike current collecting plates 32 shown in FIG. 13 were joined to the respective ends of the rolled-up electrode unit 4.

Evaluation of Cells

Invention cells 1 and 2, and the comparative cell were checked for power characteristics (power density when discharged for 15 seconds at a depth of discharge of 50%). Table 4 shows the results.

TABLE 4

| Cell | Power density [W/kg] |
| --- | --- |
| Invention cell 1 | 645 |
| Invention cell 2 | 665 |
| Comparative cell | 590 |

Table 4 indicates that invention cells 1 and 2 are higher than the comparative cell in power density presumably because the current collecting plates 6 of the invention cells have the skirt portion 62 and are therefore improved in current collecting performance and reduced in internal resistance.

A comparison between invention cell 1 and invention cell 2 indicates that a greater power density is available when the skirt portion 62 of the current collecting plate 6 is in contact with the cylindrical projection 40 over a larger area. Thus, it is apparent that the skirt portion 62 of the collecting plate 6 contributes to an improvement in current collecting performance.

The cylindrical lithium secondary cell of the invention is reduced in the contact resistance between each electrode of the rolled-up electrode unit 4 and the current collecting plate 6 to exhibit excellent power characteristics. Further in the laser welding step of joining the collecting plate 6 as fitted over the cylindrical projection 40 of the unit 4 in fabricating the secondary cell of the invention, the cylindrical projection 40 is almost entirely covered with the collecting plate 6, consequently eliminating the likelihood that the electrodes or separator will be exposed directly to the laser beam, whereby the damage to the electrodes or separator is avoidable.

The positive electrode 41 and the negative electrode 43 constituting the rolled-up electrode unit 4 are each prepared in the form of a strip having a specified width, hence a simplified fabrication process. The cylindrical projection 40 of the electrode unit 4 can be given an accurately finished cylindrical surface by rolling up the two electrodes. This obviates the reduction of the yield or variations in the cell properties.

[3] Embodiment of the Invention for Fulfilling the Third Object

Lithium secondary cells embodying the invention will further be described in detail with reference to the drawings concerned.

First Embodiment

Figure 19:
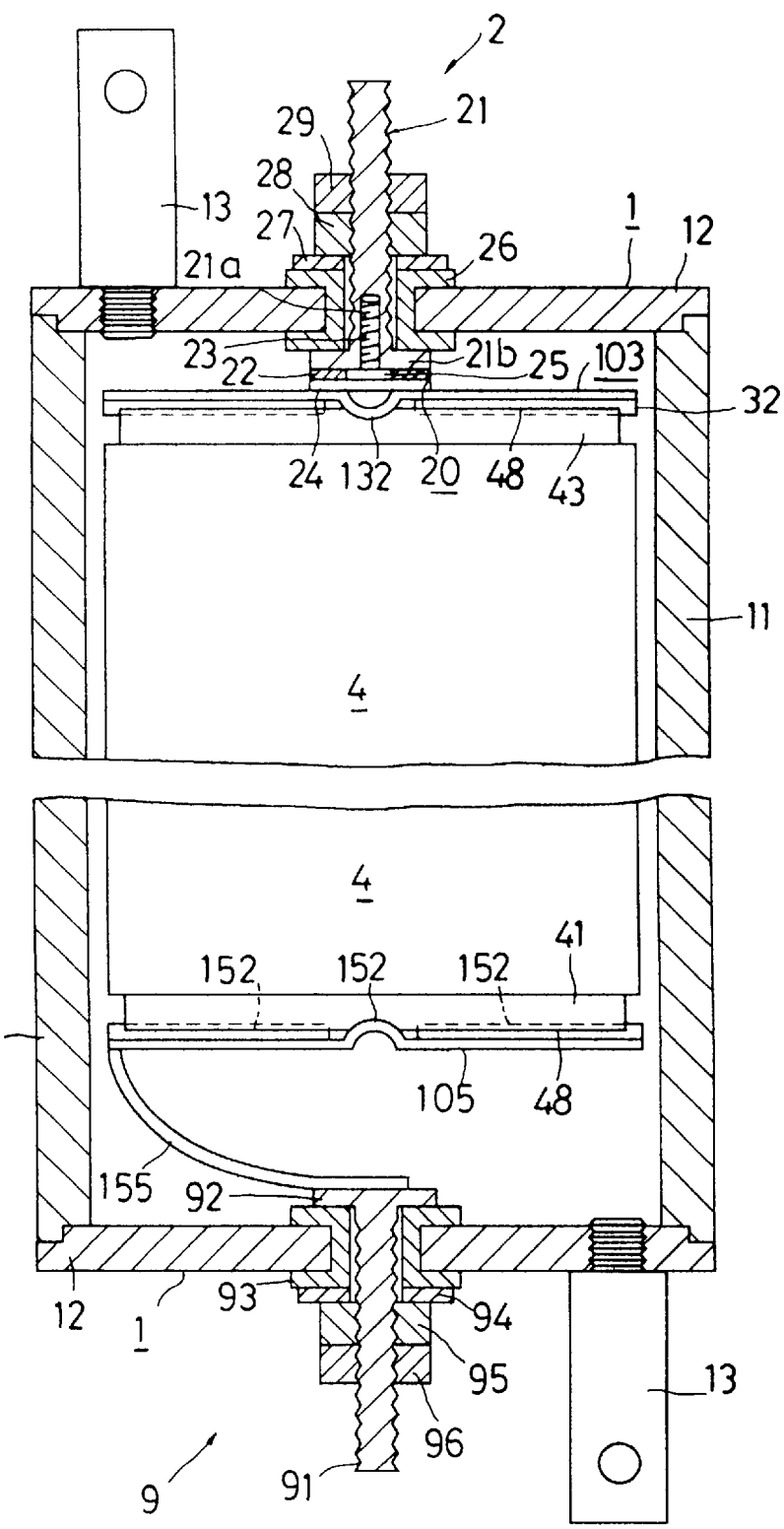
FIG. 19 is a front view partly broken away and showing a nonaqueous electrolyte secondary cell of the invention.

With reference to FIG. 19, the lithium secondary cell of this embodiment comprises a cylindrical can 1 having a cylinder 11 and lids 12, 12 welded to the respective ends thereof, and a rolled-up electrode unit 4 encased in the can 1. The lids 12, 12 have attached thereto a pair of positive and negative electrode terminal assemblies 9, 2 and gas vent valves 13, 13, respectively.

The rolled-up electrode unit 4 has the same construction as the conventional one shown in FIG. 13, and comprises a positive electrode 41, separator 42 and negative electrode 43 each in the form of a strip. The positive electrode 41 and the negative electrode 43 are superposed on respective separators 42, as displaced from the separator widthwise thereof, whereby an edge 48 of the positive electrode 41 is caused to project outward beyond the corresponding edge of the separator 42 at one of the axially opposite ends of the electrode unit 4, and an edge 48 of the negative electrode 43 is caused to extend outward beyond the edge of the separator 42 at the other end of the unit 4. As shown in FIG. 19, a pair of current collecting plates 105, 103 for the respective positive and negative electrodes are installed at the respective opposite ends of the electrode unit 4 and joined to the edges 48, 48 of the positive electrode 41 and the negative electrode 43.

Figure 20:
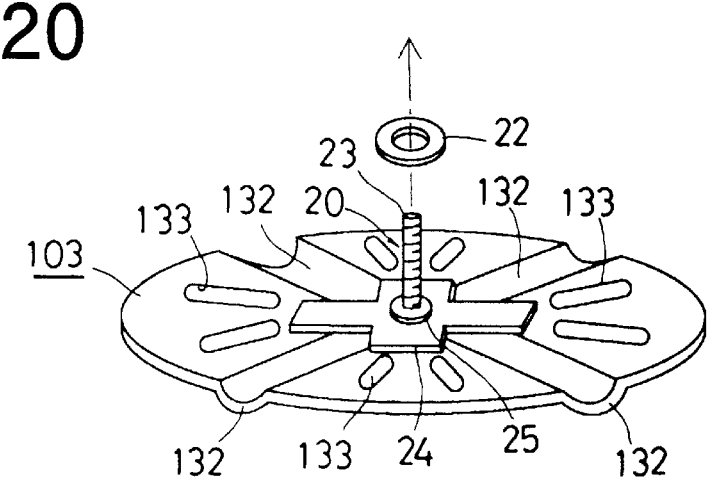
FIG. 20 is a perspective view of a current collecting plate used in the cell.
Figure 21:
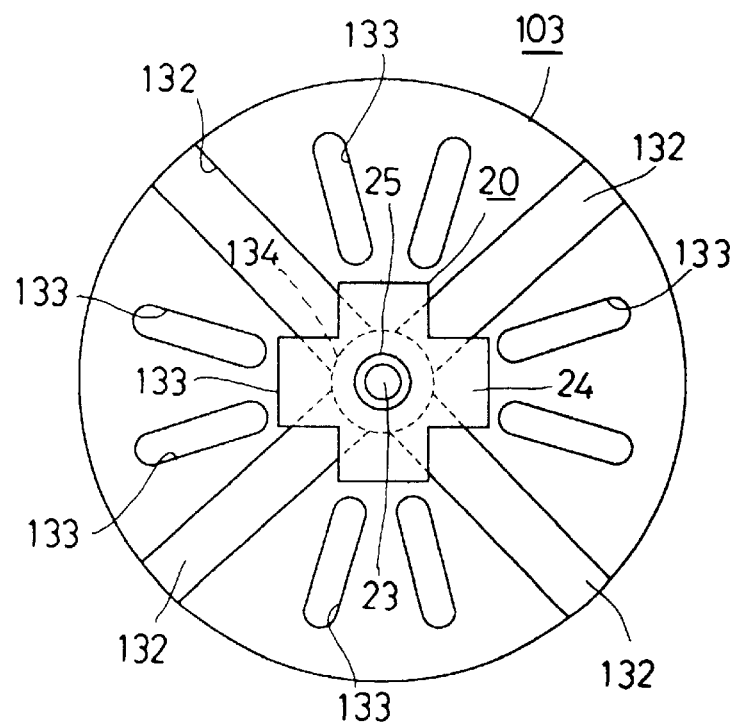
FIG. 21 is a plan view of the collecting plate.
Figure 26:
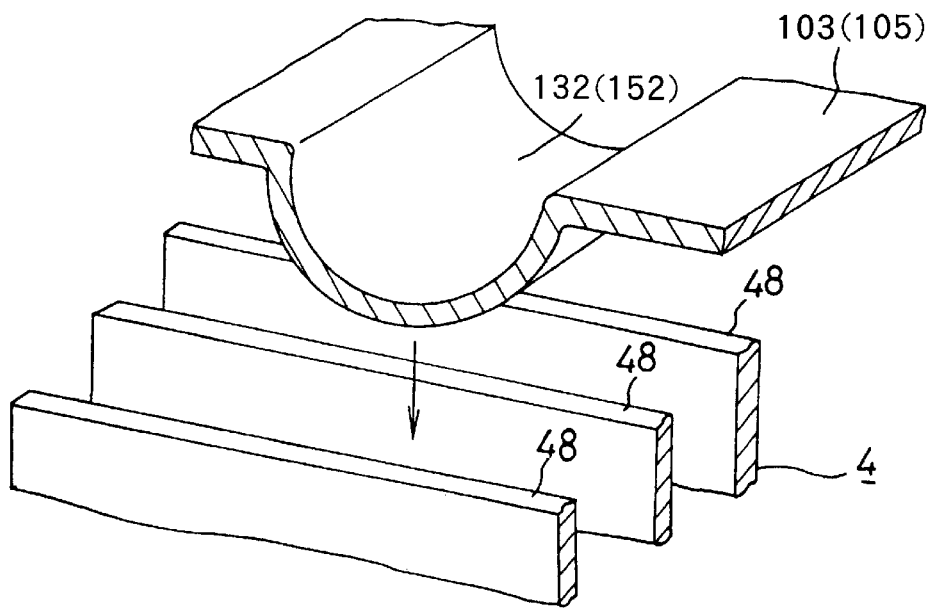
FIG. 26 is a view showing the step of joining the protrusion of the collecting plate to an edge of electrode of the rolled-up electrode unit.
Figure 27:
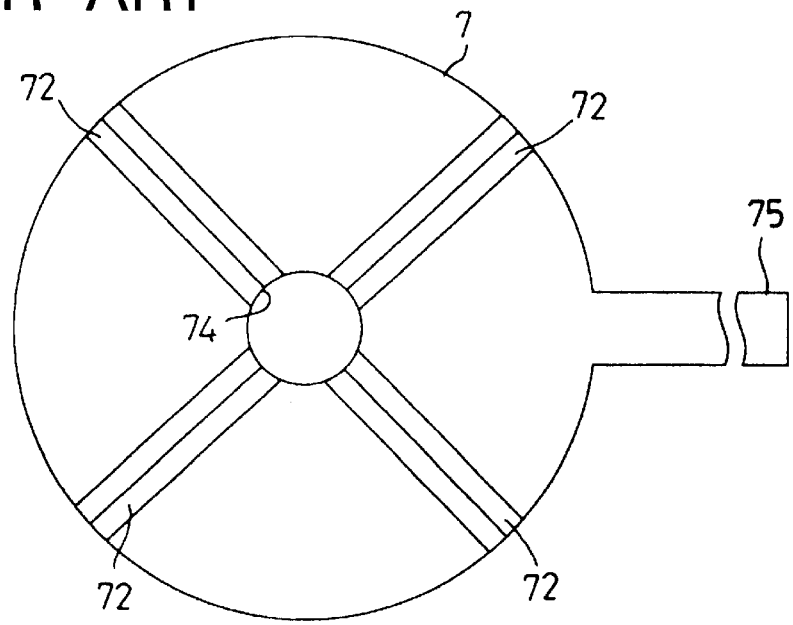
FIG. 27 is a plan view of a conventional current collecting plate.
Figure 28:
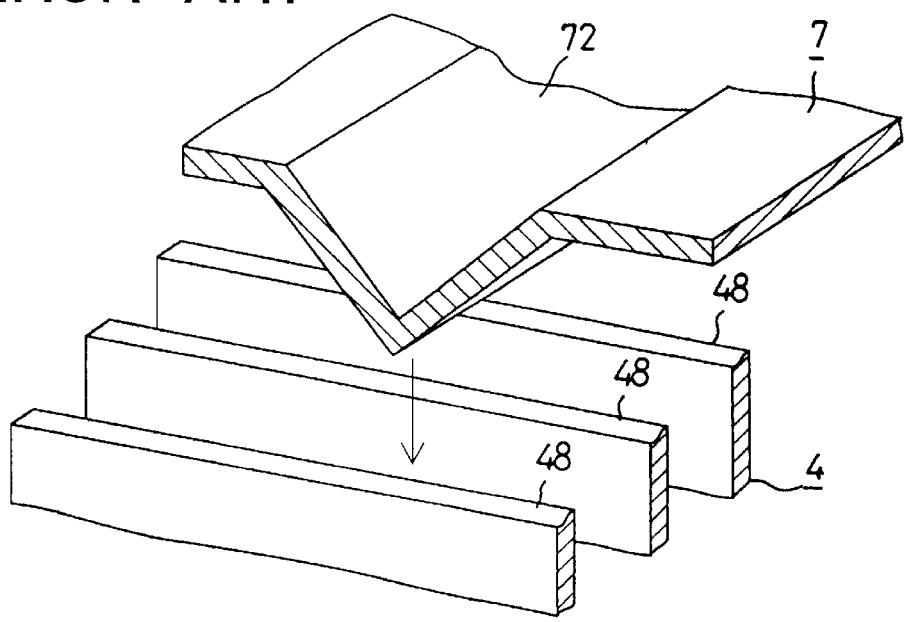
FIG. 28 is a view showing the step of joining a ridge of the conventional collecting plate to an edge of electrode of the rolled-up electrode unit.

With reference to FIGS. 20 and 21, the collecting plate 103 for the negative electrode has a central hole 134, a plurality of liquid inlets 133 and a plurality of protrusions 132 extending radially from the center of the plate and circular arc in cross section. As shown in FIG. 26, these protrusions 132 are pressed against and welded to the edge 48 of the negative electrode of the electrode unit 4.

With reference to FIG. 20, a threaded connector 20 is fixed to the center of the surface of the collecting plate 103. The threaded connector 20 comprises a cross plate 24 serving as a base plate, a disklike base 25 provided on the cross plate 24 centrally thereof, and a male screw 23 extending upright from the center of the base 25.

Figure 25:
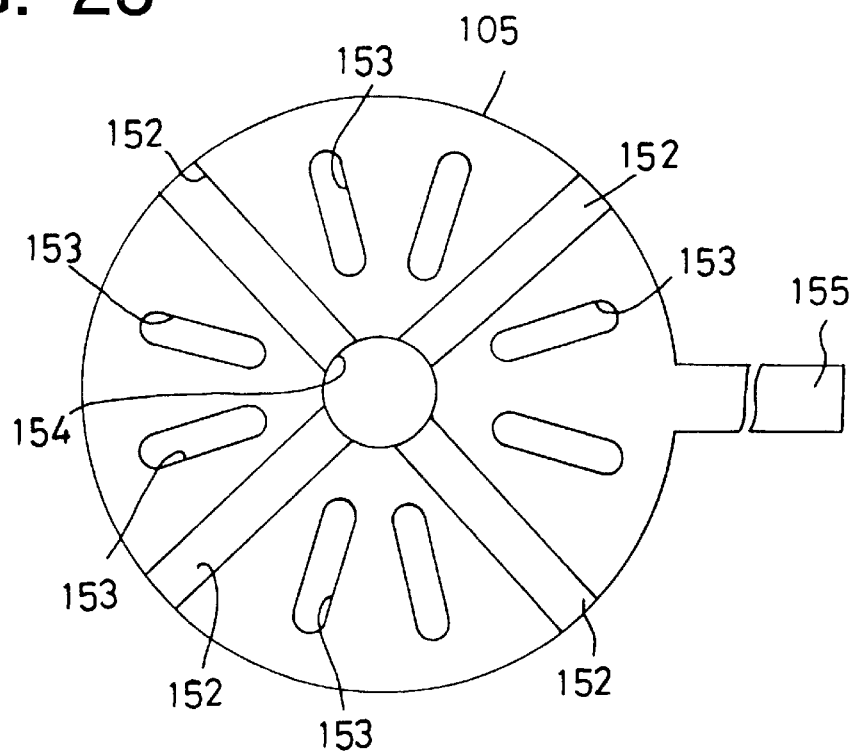
FIG. 25 is a plan view of a positive electrode current collecting plate.

Referring to FIG. 25, a striplike lead portion 155 extends outward from the outer periphery of the collecting plate 105 for the positive electrode. The collecting plate 105 has a central hole 154, a plurality of liquid inlets 153 and a plurality of protrusions 152 extending radially from the center of the plate and circular arc in cross section. As shown in FIG. 26, these protrusions 152 are pressed against and welded to the edge 48 of the positive electrode of the electrode unit 4.

Figure 22:
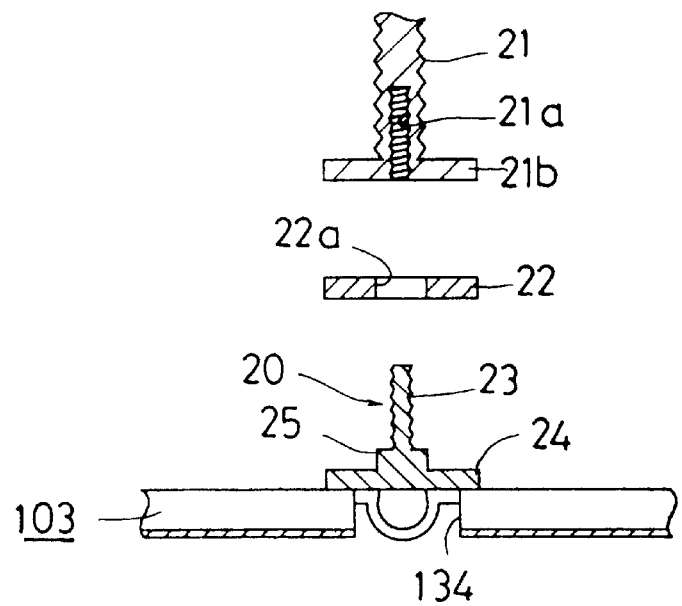
FIG. 22 is an exploded view in section showing a structure for connecting the collecting plate to an electrode terminal assembly.

As shown in FIG. 19, the negative electrode terminal assembly 2 comprises an electrode terminal 21 in the form of a screw member and extending through and attached to the lid 12 of the cell can 1. The terminal 21 has a flange 21b formed at its base end. The electrode terminal 21 has an internally threaded portion 21a extending from the flange 21b toward the screw portion and having the male screw 23 screwed therein. A metal ring 22 is fitted around the base 25. As shown in FIG. 22, the metal ring 22 has approximately the same outside diameter as the flange 21b of the terminal 21 and a hole 22a slightly greater than the base 25 in diameter. The metal ring 22 is held in intimate pressing contact with the flange 21b and the cross plate 24 by the male screw 23 screwed in the internally threaded portion 21a.

The positive electrode terminal assembly 9 comprises an electrode terminal 91 in the form of a screw member and extending through and attached to the other lid 12 of the cell can 1. The terminal 91 has a flange 92 formed at its base end. A lead portion 155 joined to the collecting plate 105 for the positive electrode is folded over inwardly of the collecting plate 105 and has its outer end joined to the flange 92 of the electrode terminal 91. The lead portion 155 is curved like a bow and elastically deformable toward or away from the electrode terminal assembly 9.

Insulating members 26, 93 of resin are fitted in the holes of the respective lids 12, 12 for the negative and positive electrodes for electrically insulating the electrode terminals 21, 91 from the lids 12, 12 and providing a seal therebetween. Each electrode terminal 21 (91) has a washer 27 (94) fitted therearound from outside the can 1, and a first nut 28 (95) and a second nut 29 (96) screwed thereon. The first nut 28 (95) is tightened up to clamp the insulating member 26 (93) between the flange 21b (92) of the terminal 21 (91) and the washer 27 (94) and thereby seal off the hole more effectively. The second nuts 29, 96 are used or connection to an external circuit. Thus, the electric power generated by the rolled-up electrode unit 4 can be delivered from the pair of positive and negative electrode terminal assemblies 9, 2 to the outside.

With the nonaqueous electrolyte secondary cell of the present embodiment, the male screw 23 is positioned on the negative electrode current collecting plate 103 centrally thereof as seen in FIG. 20, so that the average distance the current collected by the plate 103 flows to reach the male screw 23 is short. Further because the male screw 23 is screwed in the internally threaded portion 21a of the electrode terminal 21 for connection as shown in FIG. 19, the path of flow of the current from the collecting plate 103 to the electrode terminal 21 has a minimum length.

Furthermore, the cross plate 24, metal ring 22 and flange 21b are in intimate contact with one another to provide a current path of large cross sectional area as seen in FIG. 19, so that the current path has reduced electric resistance, consequently reducing the internal resistance of the cell.

Further the lead portion 155 of the current collecting plate 105 for the positive electrode is elastically deformable as shown in FIG. 19 to absorb the errors involved in assembling the rolled-up electrode unit 4 or the cell can 1.

The lithium secondary cell described is fabricated by the process to be described below. First, the current collecting plate 103 for the negative electrode shown in FIG. 20 is prepared from a nickel plate, and the collecting plate 105 for the positive electrode shown in FIG. 25 from an aluminum plate. The lead portion 155 is integral with the positive electrode collecting plate 105. The collecting plates 103, 105 are 20 mm in radius, 1.0 mm in thickness and 1.4 mm in the depth of the protrusions.

The threaded connector 20 is made from nickel in the shape shown in FIGS. 20 and 21. The cross plate 24 is 1 mm in thickness, the base 25 is 1 mm in thickness, and the male screw 23 is 6 mm in outside diameter and 9 mm in length.

Next, a current collector foil 45 in the form of a strip of aluminum foil is coated over the surface thereof with a positive electrode active substance 44 comprising a lithium containing composite oxides to prepare a positive electrode 41. A current collector foil 47 in the form of copper foil is coated over the surface thereof with a negative electrode active substance 46 containing carbon material to obtain a negative electrode 43. The positive electrode 41 and the negative electrode 43 are superposed on separators 42 as displaced widthwise thereof and wound up into a spiral form with the separator 42 interposed between the two electrodes to prepare a rolled-up electrode unit 4 as shown in FIG. 13.

Subsequently, with the collecting plate 105 pressed against the edge 48 of the positive electrode of the electrode unit 4 as shown in FIG. 26, the protrusions 152 of the collecting plate 105 are joined to the edge 48 by laser welding, and the outer end of the lead portion 155 is joined to the flange 92 of the positive electrode terminal 91 by laser welding.

Similarly, with the collecting plate 103 pressed against the edge 48 of the negative electrode of the electrode unit 4, the protrusions 132 of the collecting plate 103 are joined to the edge 48 by laser welding. Further as seen in FIGS. 20 and 21, the cross plate 24 of the threaded connector 20 is joined to the central portion of the collecting plate 103 by laser welding. The male screw 23 is driven into the internally threaded portion 21a, with the metal ring 22 fitted around the base 25 as seen in FIG. 19.

The rolled-up electrode unit 4 is thereafter encased in a cylinder 11, a pair of positive and negative electrode terminals 91, 21 are inserted into lids 12, 12 with insulating members 93, 26 interposed therebetween, washers 94, 27 are fitted around the respective terminals 91, 21, and first nuts 95, 28 and second nuts 96, 29 are screwed on the respective terminals 91, 21, whereby a pair of positive and negative electrode terminal assemblies 9, 2 are mounted on the lids 12, 12.

Figure 23:
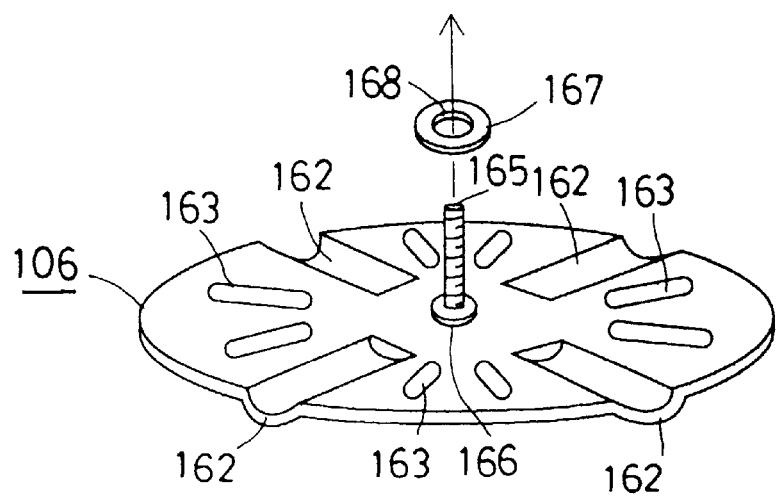
FIG. 23 is a perspective view of a current collecting plate for use in another embodiment.
Figure 24:
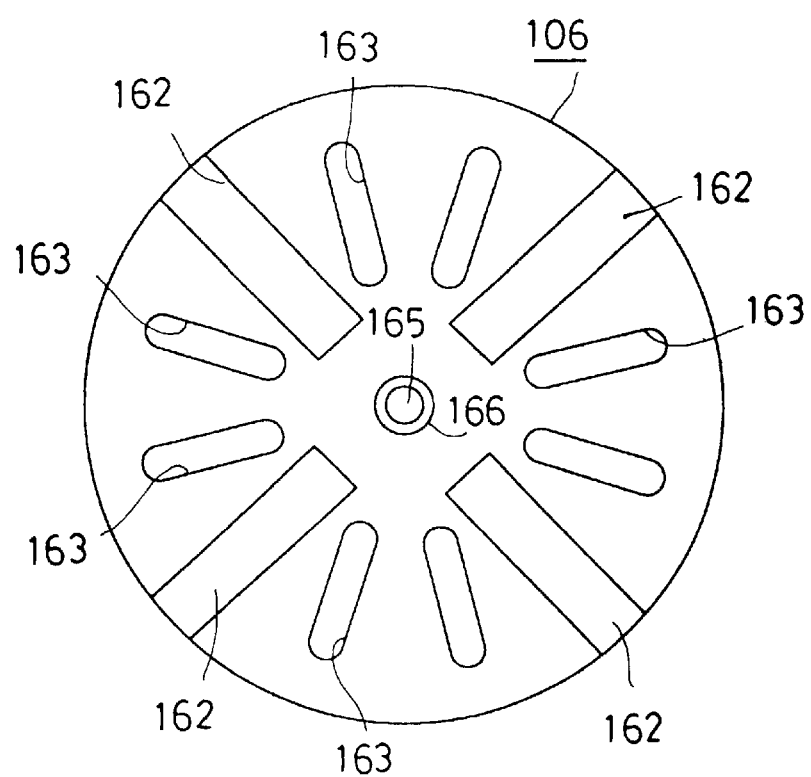
FIG. 24 is a plan view of the collecting plate.

Finally the lids 12, 12 are welded to the cylinder 11, an electrolyte is placed into the cell can 1 through a mount hole for one gas vent valve 13, and thereafter the valve 13 is screwed into the mount hole. In this way, a lithium secondary cell is completed according to the present embodiment.
Second Embodiment The lithium secondary cell of this embodiment has the same construction as the first embodiment except that the screw connector is made from copper. The cell is assembled in the same manner as the first embodiment.
Third Embodiment The lithium secondary cell of this embodiment differs from the first embodiment in that a current collecting plate 106 for the negative electrode is integral with a male screw 165 as shown in FIGS. 23 and 24.

The negative electrode current collecting plate 106 has a disklike base 166 formed on its surface centrally thereof and the male screw 165 which extends upright from the center of the base 166. A metal ring 167 shown in FIG. 23 is fitted around the base 166. The ring 167 has a hole 168 having a slightly larger diameter than the base 166, with the result that the ring 167 and the collecting plate 106 are held in intimate contact with each other. The lithium secondary cell of this embodiment has the same construction as the first embodiment with the exception of the above-mentioned feature, and is assembled in the same manner as the first embodiment.

The cell of the present embodiment has no joint between the collecting plate 106 and the male screw 165, therefore has no contact resistance therebetween and is smaller in internal resistance.

Invention cell 1 of the foregoing first embodiment, invention cell of the second embodiment, and the comparative cells to be described below, i.e., comparative cells 1 and 2, were fabricated and checked for internal resistance. The cells were about 50 Wh in rated electric power capacity.
Comparative Cell 1

Comparative cell 1 had the same construction as the first embodiment except that a current collecting plate made of nickel and shown in FIG. 25 was used for the negative electrode. The cell was assembled in the same manner as the first embodiment.
Comparative Cell 2

Comparative cell 2 had the same construction as comparative cell 1 except that the current collecting plates for the positive and negative electrodes had protrusions which were V-shaped in cross section. The cell was assembled in the same manner as the first embodiment.
[Measurement of Internal Resistance]

The cells were checked for internal resistance by a resistance meter (a.c., 4 terminals, 1 kHz).
[Results of Measurement]

Table 5 shows the internal resistance values of the cells measured.

TABLE 5

| Cell | Negative electrode | Positive Electrode | Internal Resistance (mΩ) |
|---|---|---|---|
| Invention cell 1 | Male screw: Ni Collecting plate: Ni Protrusions: circular arc | Collecting plate: Al Protrusions: circular arc | 1.5 |
| Invention cell 2 | Male screw: Cu Collecting plate: Ni Protrusions: circular arc | Collecting plate: Al Protrusions: circular arc | 1.1 |
| Comp. cell 1 | Collecting plate: Ni Protrusions: circular arc | Collecting plate: Al Protrusions: circular arc | 2.0 |
| Comp. cell 2 | Collecting plate: Ni Protrusions; V-shaped | Collecting plate: Al Protrusions: V-shaped | 2.7 |

The results given in Table 5 reveal that invention cells 1 and 2 are both smaller than comparative cells in internal resistance.

The reason is that with invention cells 1 and 2, the male screw is positioned at the center of the negative electrode current collecting plate, with the result that the average distance the current collected by the collecting plate flows before reaching the male screw is shorter. Further because the male screw is screwed in the internally threaded portion of the electrode terminal, the path of flow of the current from the collecting plate to the electrode terminal has a minimum length. Additionally, the metal ring having approximately the same outside diameter as the flange of the electrode terminal is in intimate contact with the flange and the cross plate to provide a current path of large cross sectional area.

Invention cell 2 is especially small in internal resistance because the threaded connector therein is made from copper which is smaller in resistance than the nickel used for making the threaded connector of invention cell 1.

The cells of the present invention are not limited to the foregoing embodiments in construction but can be modified variously by one skilled in the art without departing from the spirit of the invention as set forth in the appended claims.

What is claimed is:

1. A nonaqueous electrolyte secondary cell comprising a positive electrode (41) and a negative electrode (43) each in the form of a strip and rolled up into a spiral form with a separator (42) interposed between the electrodes to obtain a rolled-up electrode unit (4), and a cell can (1) having the rolled-up electrode unit (4) accommodated therein, each of the positive electrode (41) and the negative electrode (43) being formed by coating a current collector in the form of a strip with an active substance, the cell being adapted to deliver electric power generated by the rolled-up electrode unit (4) to the outside via a pair of electrode terminal portions, the nonaqueous electrolyte secondary cell being characterized in that the current collector of the positive electrode (41) or the negative electrode (43) has an edge (48) projecting from at least one of opposite ends of the rolled-up electrode unit (4), the current collector edge (48) being covered with a current collecting plate (5), the current collecting plate (5) having a plurality of circular-arc protrusions (52) projecting in a circular-arc cross section toward the current collector edge (48) and a plurality of slit pieces (53) cut to a raised form toward the current collector edge (48), the circular-arc protrusions (52) being welded to the current collector edge (48) while biting into the current collector edge (48) along with the slit pieces (53), the current collecting plate (5) being connected to one of the electrode terminal portions.

2. A nonaqueous electrolyte secondary cell according to claim 1 wherein the current collecting plate (5) comprises a disklike body (51) having the circular-arc protrusions (52) and the slit pieces (53) formed radially and opposed to the current collector edge (48), and a lead portion in the form of a strip (55) extending from an edge portion of the disklike body (51) and joined at an outer end thereof to the electrode terminal portion.

3. A nonaqueous electrolyte secondary cell according to claim 1 wherein each of the slit pieces (53) is in contact with the current collector edge (48) over a length at least 0.5 times the radius of the current collecting plate (5).

4. A nonaqueous electrolyte secondary cell according to claim 1 wherein each of the slit pieces (53) projects toward the current collector edge (48) over a length at least 1.0 times to not greater than 1.5 times the length of projection of the circular-arc protrusion (52).

5. A cylindrical secondary cell comprising a positive electrode (41) and a negative electrode (43) each in the form of a strip and rolled up into a spiral form with a separator (42) interposed between the electrodes and impregnated with a nonaqueous electrolyte to obtain a rolled-up electrode unit (4), and a cylindrical cell can (1) having the rolled-up electrode unit (4) accommodated therein, the cell being adapted to deliver electric power generated by the rolled-up electrode unit (4) to the outside via a pair of electrode terminal portions, the cylindrical secondary cell being characterized in that the positive electrode (41) and the negative electrode (43) each comprise a current collector in the form of a strip and an active substance coating the current collector, each of the electrodes having a portion coated with the active substance and extending longitudinally of the current collector, and an uncoated portion not coated with the active substance and formed along an edge of the current collector and extending longitudinally of the current collector, the uncoated portion projecting from at least one of axially opposite ends of the rolled-up electrode unit (4) to provide a cylindrical projection (40), the cylindrical projection (40) being covered with a current collecting plate (6) made of a metal, the current collecting plate (5) comprising a top plate (61) in contact with an end face of the cylindrical projection (40) and a skirt portion (62) in contact with at least a portion of an outer peripheral surface of the cylindrical projection (40), the current collecting plate (6) being connected to one of the electrode terminal portions by a lead member (63).

6. A cylindrical secondary cell according to claim 5 wherein the skirt portion (62) of the current collecting plate (6) is in the form of a cylinder intimately fittable to the outer peripheral surface of the cylindrical projection (40) of the rolled-up electrode unit (4).

7. A cylindrical secondary cell according to claim 5 wherein the top plate (61) and the skirt portion (62) of the current collecting plate (6) are joined respectively to the end face and the outer peripheral surface of the cylindrical projection (40) of the rolled-up electrode unit (4) by laser welding.

8. A cylindrical secondary cell according to claim 5 wherein the cylindrical projection (40) projecting from each of the axially opposite ends of the rolled-up electrode unit (4) is covered with the current collecting plate (6) of the metal, the current collecting plate (6) for the positive electrode being made from substantially the same material as the current collector of the positive electrode, the current collecting plate (6) for the negative electrode being made from substantially the same material as the current collector of the negative electrode, the two current collecting plates (6), (6) being connected to the pair of electrode terminal portions respectively.

9. A nonaqueous electrolyte secondary cell comprising an electrode unit encased in a cell can, the electrode unit comprising as superposed in layers a pair of positive and negative electrodes and a separator interposed between the electrodes and impregnated with a nonaqueous electrolyte, the cell being adapted to deliver electric power generated by the electrode unit to the outside via a pair of electrode terminal portions provided respectively at opposite ends of the cell can, the nonaqueous electrolyte secondary cell being characterized in that the positive electrode and the negative electrode each comprise a current collector in the form of a strip and an active substance coating the current collector, each of the electrodes having a portion coated with the active substance and extending longitudinally of the current collector, and an uncoated portion not coated with the active substance and formed along an edge of the current collector and extending longitudinally of the current collector, the uncoated portion projecting from at least one of the axially opposite ends of the electrode unit, a current collecting plate being joined to the uncoated portion and having a male screw projecting from a surface of the plate toward the electrode terminal portion, the male screw being in screw-thread engagement with an internally threaded portion formed in the electrode terminal portion.

10. A nonaqueous electrolyte secondary cell according to claim 9 wherein the male screw is integral with the current collecting plate.

11. A nonaqueous electrolyte secondary cell according to claim 9 wherein a base plate is provided on the surface of the current collecting plate centrally thereof, and the male screw is provided on a surface of the base plate.

12. A nonaqueous electrolyte secondary cell according to claim 9 wherein the opposite ends of the electrode unit have edges of current collectors forming the respective electrodes projecting therefrom, and the current collector edges have respective current collecting plates joined thereto, the male screw projecting from one of the current collecting plates, the other current collecting plate being provided with a connecting member projecting therefrom and having elasticity so as to move toward or away from the electrode terminal portion, the connecting member being joined at an outer end thereof to the electrode terminal portion.

13. A nonaqueous electrolyte secondary cell comprising an electrode unit encased in a cell can, the electrode unit comprising as superposed in layers a pair of positive and negative electrodes and a separator interposed between the electrodes and impregnated with a nonaqueous electrolyte, the cell being adapted to deliver electric power generated by the electrode unit to the outside via a pair of electrode terminal portions provided respectively at opposite ends of the cell can, the nonaqueous electrolyte secondary cell being characterized in that an edge of a current collector forming the electrode projects from at least one of opposite ends of the electrode unit, a current collecting plate being joined to the edge and having a male screw projecting from a surface of the plate toward the electrode terminal portion, the male screw being in screw-thread engagement with an internally threaded portion formed in the electrode terminal portion, wherein the opposite ends of the electrode unit have edges of current collectors forming the respective electrodes projecting therefrom, and the current collector edges have respective current collecting plates joined thereto, the male screw projecting from one of the current collecting plates, the other current collecting plate being provided with a connecting member projecting therefrom and having elasticity so as to move toward or away from the electrode terminal portion, the connecting member being joined at an outer end thereof to the electrode terminal portion.

14. A nonaqueous electrolyte secondary cell according to claim 13 wherein the male screw is integral with the current collecting plate.

15. A nonaqueous electrolyte secondary cell according to claim 13 wherein a base plate is provided on the surface of the current collecting plate centrally thereof, and the male screw is provided on a surface of the base plate.

* * * * *